US010547786B2

(12) United States Patent
Pan et al.

(10) Patent No.: US 10,547,786 B2
(45) Date of Patent: Jan. 28, 2020

(54) IMAGE PROCESSING FOR TURBULENCE COMPENSATION

(71) Applicant: CANON KABUSHIKI KAISHA, Tokyo (JP)

(72) Inventors: Ruimin Pan, Macquarie Park (AU); Matthew Raphael Arnison, Umina Beach (AU); David Robert James Monaghan, Elanora Heights (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/956,109

(22) Filed: Apr. 18, 2018

(65) Prior Publication Data
US 2018/0324359 A1    Nov. 8, 2018

(30) Foreign Application Priority Data

May 2, 2017   (AU) ............................... 2017202910

(51) Int. Cl.
*H04N 5/232*   (2006.01)
*G06T 7/571*   (2017.01)
*G06T 7/593*   (2017.01)

(52) U.S. Cl.
CPC ......... *H04N 5/23267* (2013.01); *G06T 7/571* (2017.01); *G06T 7/593* (2017.01);
(Continued)

(58) Field of Classification Search
None
See application file for complete search history.

(56) References Cited

U.S. PATENT DOCUMENTS 4,011,445 A * 3/1977 O'Meara ............... G01S 7/499
                                                    398/205
6,108,576 A * 8/2000 Alfano ................ A61B 5/0073
                                                    600/310
(Continued)

FOREIGN PATENT DOCUMENTS

WO    2014/018584 A1    1/2014

OTHER PUBLICATIONS

Alterman, Marina, et al., "Passive Tomography of Turbulence Strength", In Proceedings of ECCV 2014, Proceedings from European conference on computer vision, Zurich, Switzerland, Sep. 2014, pp. 1-14.
(Continued)

*Primary Examiner* — Cynthia Segura
(74) *Attorney, Agent, or Firm* — Canon U.S.A., Inc. I.P. Division

(57) ABSTRACT

One or more embodiments of an apparatus, system and method of compensating image data for phase fluctuations caused by a wave deforming medium, and storage or recording mediums for use therewith, are provided herein. At least one embodiment of the method comprises capturing, by a sensor of an imaging system, first image data and second image data for each of a plurality of pixel positions of the sensor, the sensor capturing an object through a wave deforming medium causing a defocus disparity between the first image data and second image data; and determining the defocus disparity between the first image data and the second image data, the defocus disparity corresponding to a defocus wavefront deviation of the wave deforming medium. The method may further comprise compensating the image data captured by the sensor for phase fluctuations caused by the wave deforming medium using the determined defocus disparity.

25 Claims, 16 Drawing Sheets

(52) U.S. Cl.
CPC ............... *G06T 2207/10012* (2013.01); *G06T 2207/20201* (2013.01); *G06T 2207/20228* (2013.01)

(56) References Cited

U.S. PATENT DOCUMENTS

| | | | | |
|---|---|---|---|---|
| 7,218,959 | B2* | 5/2007 | Alfano | A61B 5/0073 600/310 |
| 8,009,189 | B2* | 8/2011 | Ortyn | G01N 21/6458 348/80 |
| 8,447,129 | B2 | 5/2013 | Arrasmith | |
| 8,730,573 | B2 | 5/2014 | Betzig et al. | |
| 2010/0008597 | A1* | 1/2010 | Findlay | G06T 5/003 382/275 |
| 2011/0013016 | A1* | 1/2011 | Tillotson | G01N 21/41 348/135 |
| 2015/0332443 | A1* | 11/2015 | Yamada | G06T 5/002 382/274 |
| 2016/0035142 | A1* | 2/2016 | Nair | G06T 19/20 345/420 |
| 2018/0007342 | A1* | 1/2018 | Rodriguez Ramos | G01J 11/00 |

OTHER PUBLICATIONS

Barankov, Roman, et al., "High-resolution 3D phase imaging using a partitioned detection aperture: a wave-optic analysis", Journal of the Optical Society of America, Research article, Nov. 2015, pp. 2123-2135.

Carrano, Carmen J., "Speckle imaging over horizontal paths", Proceedings of SPIE, Jan. 2002, vol. 4825, pp. 109-120.

Lou, Y., et al., "Video stabilization of atmospheric turbulence distortion", Inverse Problems and Imaging, Mar. 2013, vol. 7, No. 3, pp. 839-861.

Roggemann, M. and B. Welsh, "Imaging through turbulence", CRC Press: US., Jan. 1996, p. 99.

Butterley, T. et al., "Determination of the profile of atmospheric optical turbulence strength from SLODAR data", Monthly Notices of the Royal Astronomical Society, vol. 369, Mar. 2006, pp. 835-845.

Schechner, Yoav, et al., "Depth from Defocus vs. Stereo: How Different Really Are They?", International Journal of Computer Vision, vol. 39, No. 2, Sep. 2000, pp. 141-162.

Zhuo, Shaojie, et al., "Defocus map estimation from a single image", Pattern Recognition, vol. 44, Sep. 2011, pp. 1852-1858.

Roddier, Francois, "Curvature sensing and compensation: a new concept in adaptive optics", Applied Optics, vol. 27, No. 7, Apr. 1, 1988, pp. 1223-1225.

Ji, Na, et al., "Adaptive Optics via Pupil Segmentation for High-Resolution Imaging in Biological Tissues", article in Nature Methods, vol. 7, No. 2, pp. 141-147, Feb. 2010, doi:10.1038/nmeth.1411 (33 pages total).

Wahl, Daniel J., et al., "Pupil Segmentation Adaptive Optics for In vivo Mouse Retinal Fluorescence Imaging", Optics Letters, vol. 42, No. 7, pp. 1365-1368, published Mar. 29, 2017, doi:10.1364/OL.42.001365.

Saint-Jacques, David, "Astronomical seeing in space and time—a study of atmospheric turbulence in Spain and England, 1994-98", University of Cambridge, Dec. 1998 (162 pages included; see Chapter 2).

Platt, B. and R.V. Shack, "Production and Use of a Lenticular Hartmann Screen", Program of the 1971 Spring Meeting of the Optical Society of America, Apr. 5-8, 1971 (see p. 656 reference or p. 9 of the 50 page submission).

* cited by examiner

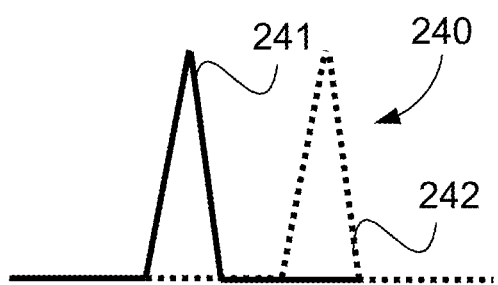
Fig. 2B(1)
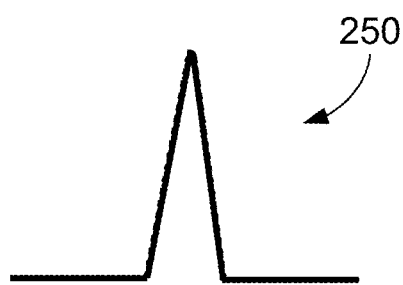
Fig. 2B(2)
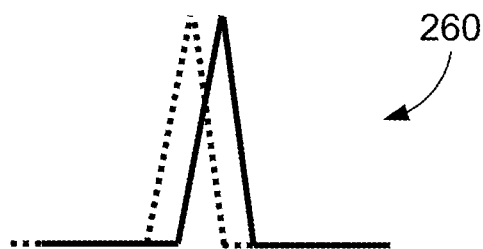
Fig. 2B(3)
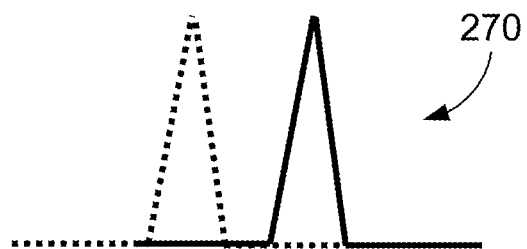
Fig. 2B(4)

IMAGE PROCESSING FOR TURBULENCE COMPENSATION

CROSS-REFERENCE TO RELATED APPLICATION(S)

This application relates, and claims priority under 35 U.S.C. § 119, to Australian Patent Application Serial No. 2017202910, filed May 2, 2017, which is hereby incorporated by reference herein in its entirety.

TECHNICAL FIELD

The present disclosure relates to one or more embodiments of a system and method for measurement of atmospheric turbulence strength and for compensation of degradation effect due to atmospheric turbulence in image processing.

BACKGROUND

Atmospheric turbulence is a well-known source of distortion that can degrade the quality of images and videos acquired by cameras viewing scenes from long distances. In astronomy in particular, stars in outer space viewed through ground-based telescopes appear blurry and flickering. The blurring and flickering is due to fluctuation in the refractive index of Earth's atmosphere. The fluctuations in the refractive index of the atmosphere involve many factors including wind velocity, temperature gradients, and elevation. The dominant factor is usually temperature variation.

Light in a narrow spectral band approaching the atmosphere from a distant light source, such as a star, is modelled by a plane wave. The planar nature of the wave remains unchanged as long as the wave propagates through free space, which has a uniform index of refraction. The atmosphere, however, contains a multitude of randomly distributed regions of uniform index of refraction, referred to as turbulent eddies. The index of refraction varies from eddy to eddy. As a result, the light wave that reaches the surface of the Earth is not planar. FIG. 1 demonstrates the effect of Earth's atmosphere on the wavefront of a distance point source. In FIG. 1, after the plane wave passes through a turbulent layer in the atmosphere, the plane wave's wavefront becomes perturbed. Excursions of the wave from a plane are manifested as random aberrations in astronomical imaging systems. The general effects of optical aberrations include broadening of the point spread function and lower resolution. Although some blurring effects can be corrected by fixed optics in the design of the telescope, the spatially random and temporally varying nature of atmospheric turbulence makes correction difficult.

In ground-based long-distance surveillance, the situation is often worse because, unlike astronomical imaging, the effects of turbulence in long-distance surveillance exist in the whole imaging path. Therefore the captured images not only exhibit distortion caused by atmospheric turbulence close to the lens aperture, with similar results to that in astronomy, but also exhibit distortion caused by atmospheric turbulence closer to the object of interest.

The observation of atmospheric turbulence and the impact of atmospheric turbulence on astronomical imaging are long known. In the absence of turbulence correction, attaining diffraction limited performance at visible wavelengths with a ground-based telescope bigger than a few tens of centimetres in diameter was considered impossible. Isaac Newton noted that the point spread function of a telescope looking through turbulence is broader than would be expected in the absence of the atmosphere. However, the turbulence effect could not be recorded in short exposure images referred to as 'speckle images' until fast film systems were developed.

In order to efficiently correct for the effect of atmospheric turbulence, accurate estimation of the strength of turbulence in long distance imaging is important. The turbulence strength $C_n^2$ depends on many factors such as the average shear rate of the wind and the average vertical gradient of the potential temperature.

Because the average shear rate of the wind and the average vertical gradient of the potential temperature are typically difficult to measure, in practice, the turbulence strength $C_n^2$ (or equivalently the Fried parameter $r_0$) is often measured using profiling techniques such as SLODAR (SLOpe Detection And Ranging). In Slope Detection And Ranging techniques, two Shack-Hartmann wavefront sensors are used to estimate not only the height of the turbulent atmospheric layer but also the turbulence strength $C_n^2$ for each layer. In Slope Detection And Ranging turbulence profiling, the total turbulence strength along the imaging path is estimated using a temporal variance of the one dimensional motion of the centroids in the Shack-Hartmann image. Using a temporal variance for turbulence profiling requires multiple frames and therefore is not a real-time estimate of turbulence strength. Furthermore, a Shack-Hartmann wavefront sensor requires a point source (guide star) to work properly, which is not always available in long distance imaging along horizontal paths. In addition, Shack-Hartmann wavefront sensors generally have a small working area, making the sensors unsuitable for wide-field applications such as long distance surveillance. Shack-Hartmann wavefront sensors also require specialised optics which significantly raises the cost and size of an imaging system.

Turbulence strength measurement using passive tomography has also been proposed. In the passive tomography method, multiple consumer-grade cameras are set up to capture a short video of the scene from different angles. Around 100 captured frames from each camera are used to estimate the temporal variance $\sigma_x^2$ of the image pixel displacement x. Using the relationship between this temporal variance and the turbulence strength along the line of sight of each camera, a linear system can be solved to obtain the 3-dimensional distribution of the turbulence strength $C_n^2$. Although the passive tomography method has an advantage of being wide-field and needing only simple equipment, the method still requires a large number of cameras and complex set-up. Most importantly, because multiple frames are needed to calculate the temporal variance, the result is not a real-time measurement of the turbulence strength.

Additionally, one can also artificially introduce a phase diversity or wavelength diversity in two or more simultaneous captures of the same scene in order to measure the turbulence. In particular, the phase diversity compensation method uses a known additive phase term. For example, a partitioned aperture wavefront (PAW) sensing method uses 4 simultaneous captures with contrived phase steps to calculate the wavefront phase slope in order to correct phase disturbance caused by a sample. In some known implementations, a scene is recorded at two different narrow-band wave lengths centred at $\lambda_1$ and $\lambda_2$ and the turbulence optical transfer function (OTF) is estimated using an autocorrelation of a generalized pupil function. Introducing an artificial phase or wavelength diversity involves complex system design and calibration and often limits the application to research fields such as microscopy or special multi-spectral imaging.

While the measurement of turbulence strength is not straightforward, most atmospheric turbulence compensation methods rely on a reasonable estimate of a turbulence strength value. Generally, there are two basic categories to compensate for the effects of atmospheric turbulence, namely, 1) adaptive optics systems, and 2) post-processing atmospheric turbulence compensation systems.

Adaptive optics systems are hardware-based systems that can correct atmospheric-turbulence effects in real-time by directly compensating for the wavefront phase disturbance using a deformable mirror. Adaptive optics systems are generally cumbersome, require extensive hardware and are expensive. Adaptive optics systems are also predominantly designed for fixed sites and are not typically portable.

Post-processing atmospheric turbulence compensation systems are largely implemented in software. One common sub-category of software-based systems is the speckle imaging method, where a large number of fast exposures of the scene are captured and combined to produce a turbulence free image. One example is a tiled bispectral analysis method, where the phase closure property of the bispectrum is utilized to calculate the phase of the spatial frequency spectrum of the original turbulence free scene using overlapping tiles in the captured frames.

Another speckle imaging example is 'lucky imaging', where a small number of good quality frames or regions are selected from a large number of mostly highly distorted frames, to restore the high resolution scene. Traditionally, criteria such as variance or gradient are used. However, the selection of good quality frames may be unreliable as the variance and gradient are affected by the intrinsic scene spectrum and the lens optical transfer function, as well as by the atmospheric turbulence. In addition, lucky imaging requires discarding many frames to achieve a restored image, and is therefore often highly inefficient in terms of overall light gathering power, and difficult to use when the scene is changing quickly.

Many post-processing turbulence compensation methods apply multi-frame blind deconvolution to improve the frame resolution based on information from multiple frames. However, due to the lack of real-time, local turbulence strength estimation, the effect of blind deconvolution algorithms is minimal.

SUMMARY

It is at least one object of one or more embodiments of the present disclosure to substantially overcome, or at least ameliorate, one or more issues of existing arrangements.

At least one aspect of the present disclosure provides at least one method of compensating image data for phase fluctuations caused by a wave deforming medium, the method comprising: capturing, by a sensor of an imaging system, first image data and second image data for each of a plurality of pixel positions of the sensor, the sensor capturing an object through a wave deforming medium causing a defocus disparity between the first image data and second image data; determining the defocus disparity between the first image data and the second image data, the defocus disparity corresponding to a defocus wavefront deviation of the wave deforming medium; and compensating the image data captured by the sensor for phase fluctuations caused by the wave deforming medium using the determined defocus disparity.

In some aspects, the first image data and the second image data is captured using a dual-pixel autofocus sensor.

In some aspects, the defocus disparity between the first image data and the second image data relates to displacement between left pixel data and right pixel data of the dual-pixel autofocus sensor.

In some aspects, the first image data and the second image data is a captured by a stereo camera, and the defocus disparity between the first image data and the second image data relates to displacement between left and right image data captured by the stereo camera.

In some aspects, the first image data and the second image data comprises a first image and a second image captured at different times, and the defocus disparity between the first image data and the second image data relates to a relative blur between the first image and the second image.

In some aspects, the defocus wavefront deviation is determined based on a defocus distance, the defocus distance being determined using the relative blur between the first image and the second image.

In some aspects, processing at least one of the first image data and second image data comprises: determining a look-up table comprising a mapping between a strength of phase fluctuations caused by the wave deforming medium and a tile size for a tile-based turbulence compensation method; selecting a tile size from the look-up table based on the determined strength of phase fluctuations; and applying the tile-based compensation method using the selected tile size to correct for the phase fluctuations.

In some aspects, the received first image data and second image data comprises a plurality of frames.

In some aspects, strength of phase fluctuations in a region of a frame is determined based on a plurality of samples of the strength of phase fluctuations determined within the region of the frame.

In some aspects, the method further comprises: compensating for phase fluctuations caused by the wave deforming medium based on comparison of the strength of phase fluctuations associated with the plurality of frames.

In some aspects, the method further comprises: compensating for phase fluctuations caused by the wave deforming medium by fusing the plurality of frames based on values of the strength of phase fluctuations determined within each one of the plurality of frames.

In some aspects, the fusing comprises: for each region in a fused image, determining a plurality of corresponding regions from the plurality of frames, each corresponding region being associated with a strength of phase fluctuations; comparing the strength of phase fluctuations for the determined corresponding regions; forming a region of the fused image based on the comparison.

In some aspects, forming a region of the fused image comprises selecting a region from the determined plurality of corresponding regions having a strength of phase fluctuation below a predetermined threshold.

In some aspects, forming a region of the fused image comprises selecting a region from the determined plurality of corresponding regions having a lowest strength of phase fluctuation.

In some aspects, processing at least one of the first image data and second image data comprises deconvolving the image data using a point spread function, the size of the point spread function at a particular position being determined using the strength of phase fluctuation determined at the particular pixel position.

In some aspects, the defocus wavefront deviation is determined based on disparity in the first image data and the second image data with respect to reference image data at a predetermined pixel position, and the reference image data is determined by convolving the first image data with a kernel having a predetermined width.

In some aspects, the disparity is a ratio of a gradient magnitude of the second image data over a gradient magnitude of the reference image data, the ratio determined at a pixel with maximum gradient across an edge.

In some aspects, determining the defocus wavefront deviation comprises estimating the wavefront deviation using one dimensional signals captured using an autofocus sensor of a device capturing the image.

In some aspects, processing at least one of the first image data and second image data comprises: determining a region associated with the object in a plurality of frames of the received image; determining an average strength of phase fluctuations for the region in each of the plurality of frames, and selecting a frame based on the average strength of phase fluctuations for the region.

In some aspects, the method further comprises generating a fused high-resolution image from the regions based on the average strength of phase fluctuations.

In some aspects, the method further comprises determining a strength of phase fluctuations caused by the wave deforming medium using the defocus wavefront deviation and lens intrinsic characteristic, the strength of phase fluctuations being determined with reference to a defocus Zernike coefficient.

Another aspect of the present disclosure provides a computer readable medium having at least one computer program stored thereon for causing at least one processor to perform a method for determining a turbulence strength for processing image data, the method comprising: receiving image data for a portion of an image captured by a dual-pixel sensor through a wave deforming medium; determining a defocus disparity between left pixel data and right pixel data of the dual-pixel sensor, the defocus disparity corresponding to a defocus wavefront deviation of the wave deforming medium; and determining the turbulence strength caused by the wave deforming medium using the determined defocus disparity between left pixel data and right pixel data to process the image data.

Another aspect of the present disclosure provides an image capture apparatus configured to determine phase fluctuations of a wave deforming medium, the image capturing apparatus comprising: a memory; a lens system focusing light travelling from an imaging scene through the wave deforming medium on an image sensor; the image sensor configured to capture image data from the lens system as first pixel data and second pixel data for each of a plurality of pixel positions, the image sensor being coupled to the memory, the memory storing the captured first pixel data and second pixel data; and a processor coupled to the memory and configured to determine phase fluctuations caused by the wave deforming medium using a defocus disparity between the first pixel data and the second pixel data captured by the image sensor.

Another aspect of the present disclosure provides a system, comprising: an image capture sensor, a memory, and a processor, wherein the processor executes code stored on the memory to: receive, from the image capture sensor, first image data and second image data for each of a plurality of pixel positions of the image capture sensor, the image data capturing an object through a wave deforming medium causing a defocus disparity between the first image data and second image data; determine the defocus disparity between the first image data and the second image data, the defocus disparity corresponding to a defocus wavefront deviation of the wave deforming medium; and compensate the image data captured by the image capture sensor for phase fluctuations caused by the wave deforming medium using the determined defocus disparity.

Another aspect of the present disclosure provides a method of processing image data, the method comprising: receiving image data for a portion of an image, the received image data capturing an object through a wave deforming medium; determining a defocus wavefront deviation using disparity in the image data; determining a strength of phase fluctuations caused by the wave deforming medium using the defocus wavefront deviation, lens intrinsic characteristics and a defocus Zernike coefficient; and processing the image data using the determined strength of phase fluctuations to compensate for phase fluctuations caused by the wave deforming medium.

In some aspects, the received image data comprises image data captured using a dual-pixel autofocus sensor.

In some aspects, the disparity in the image data relates to displacement between left pixel data and right pixel data of the dual-pixel autofocus sensor.

In some aspects, the image data is a captured by a stereo camera, and disparity in the image data relates to displacement between left and right image data captured by the stereo camera.

In some aspects, the image data comprises a first image and a second image captured at different times, the disparity in the image data relates to a relative blur between the first image and the second image.

In some aspects, the defocus wavefront deviation is determined based on a defocus distance, the defocus distance being determined using the relative blur between the first image and the second image.

In some aspects, processing the image data comprises: determining a look-up table comprising a mapping between a strength of phase fluctuations caused by the wave deforming medium and a tile size for a tile-based turbulence compensation method; selecting a tile size from the look-up table based on the determined strength of phase fluctuations; and applying the tile-based compensation method using the selected tile size to correct for the phase fluctuations.

In some aspects, the received image data comprises a plurality of frames.

In some aspects, strength of phase fluctuations in a region of a frame is determined based on a plurality of samples of the strength of phase fluctuations determined within the region of the frame.

In some aspects, the method further comprises: compensating for phase fluctuations caused by the wave deforming medium based on comparison of the strength of phase fluctuations associated with the plurality of frames.

In some aspects, the method further comprises: compensating for phase fluctuations caused by the wave deforming medium by fusing the plurality of frames based on values of the strength of phase fluctuations determined within each one of the plurality of frames.

In some aspects, the fusing comprises: for each region in a fused image, determining a plurality of corresponding regions from the plurality of frames, each corresponding region being associated with a strength of phase fluctuations; comparing the strength of phase fluctuations for the determined corresponding regions; forming a region of the fused image based on the comparison.

In some aspects, forming a region of the fused image comprises selecting a region from the determined plurality of corresponding regions having a strength of phase fluctuation below a predetermined threshold.

In some aspects, forming a region of the fused image comprises selecting a region from the determined plurality of corresponding regions having a lowest strength of phase fluctuation.

In some aspects, processing the image data comprises deconvolving the image data using a point spread function, the size of the point spread function at a particular position being determined using the strength of phase fluctuation determined at the particular pixel position.

In some aspects, the defocus wavefront deviation is determined based on disparity in the received image data with respect to reference image data at a predetermined pixel position, and the reference image data is determined by convolving the received image data with a kernel having a predetermined width.

In some aspects, the disparity is a ratio of a gradient magnitude of the received image data over a gradient magnitude of the reference image data, the ratio determined at a pixel with maximum gradient across an edge.

In some aspects, determining the defocus wavefront deviation comprises estimating the wavefront deviation using one dimensional signals captured using an autofocus sensor of a device capturing the image.

In some aspects, processing the image data comprises: determining a region associated with the object in a plurality of frames of the received image; determining an average strength of phase fluctuations for the region in each of the plurality of frames, and selecting a frame based on the average strength of phase fluctuations for the region.

In some aspects, the method further comprises generating a fused high-resolution image from the regions based on the average strength of phase fluctuations.

Another aspect of the present disclosure provides a computer readable medium having at least one computer program stored thereon for causing at least one processor to execute a method for determining a turbulence strength for processing image data, the method comprising: receiving image data for a portion of an image captured by a dual-pixel sensor through the wave deforming medium; determining disparity between left pixel data and right pixel data of the dual-pixel sensor; and determining the turbulence strength caused by the wave deforming medium using the determined disparity between left pixel data and right pixel data, lens intrinsic characteristics and a defocus Zernike coefficient to process the image data.

Another aspect of the present disclosure provides an image capture apparatus adapted to determine phase fluctuations of a wave deforming medium, the image capturing apparatus comprising: a memory; a lens focusing light travelling from an imaging scene through the wave deforming medium on an image sensor; the image sensor configured to capture image data from the lens as left pixel data and right pixel data for each of a plurality of pixel positions, the image sensor being coupled to the memory, the memory storing the captured left pixel data and right pixel data; and a processor coupled to the memory and configured to determine phase fluctuations caused by the wave deforming medium using disparity between the left pixel data and the right pixel data captured by the image sensor.

Another aspect of the present disclosure provides a system, comprising: an image capture sensor, a memory, and a processor, wherein the processor executes code stored on the memory to: receive image data for a portion of an image from the image capture sensor, the received image data capturing an object through a wave deforming medium; determine a defocus wavefront deviation using disparity in the image data; determining a strength of phase fluctuations caused by the wave deforming medium using the defocus wavefront deviation, lens intrinsic characteristics and a defocus Zernike coefficient; and process the image data using the determined strength of phase fluctuations to compensate for phase fluctuations caused by the wave deforming medium.

Other aspects of one or more embodiments of the disclosure are also disclosed.

BRIEF DESCRIPTION OF THE DRAWINGS

One or more embodiments of the disclosure will now be described with reference to the following drawings, in which:

FIGS. 2B(1) to 2B(4) show examples of phase-difference detection autofocus;

DETAILED DESCRIPTION INCLUDING BEST MODE

Figure 1:
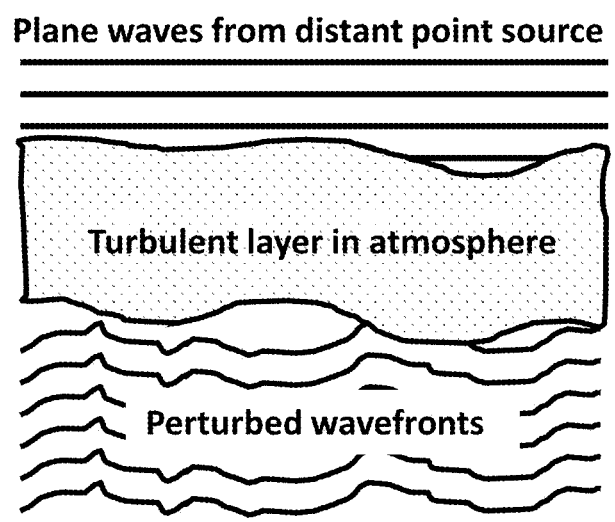
FIG. 1 illustrates the effect of atmospheric turbulence on the wavefront of a plane wave.

Where reference is made in any one or more of the accompanying drawings to steps and/or features, which have the same reference numerals, those steps and/or features have for the purposes of this description the same function(s) or operation(s), unless the contrary intention appears.

The earth's atmosphere effectively forms a wave deforming medium due to atmospheric turbulence. As discussed above, existing solutions to compensate for atmospheric turbulence can cause issues. An estimate of turbulence strength that is accurate, spatially local, and real-time would be useful for use in turbulence compensation methods.

An overview of dual-pixel autofocus technology is now described. Dual-pixel autofocus technology provides one means for an image capture process that enables instantaneous estimate of local atmospheric turbulence strength.

Figure 3:
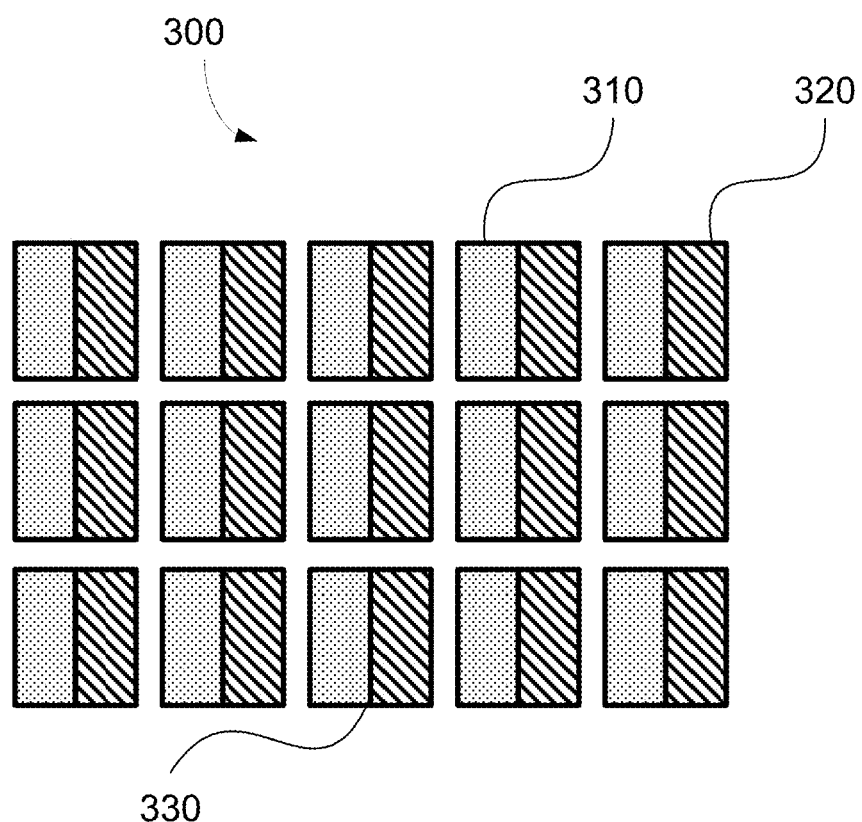
FIG. 3 shows an example of pixels of a dual-pixel autofocus sensor.

Dual-pixel autofocus (DAF) is a sensor technology that provides phase-difference detection autofocus on a camera during live preview still photo capture and during video recording. Dual-pixel autofocus uses a dual-pixel autofocus sensor in place of a typical main image capture sensor. Live preview is also known as Live View. For the purposes of the present disclosure, however, the ability of the camera to provide autofocus functionality using the dual pixel sensor is not essential. If a camera has left and right photodiodes for each image pixel position or sensor pixel, e.g. as shown in FIG. 3, usable for purposes other than autofocus, the main sensor can also be referred to as a dual-pixel sensor.

Figure 2A:
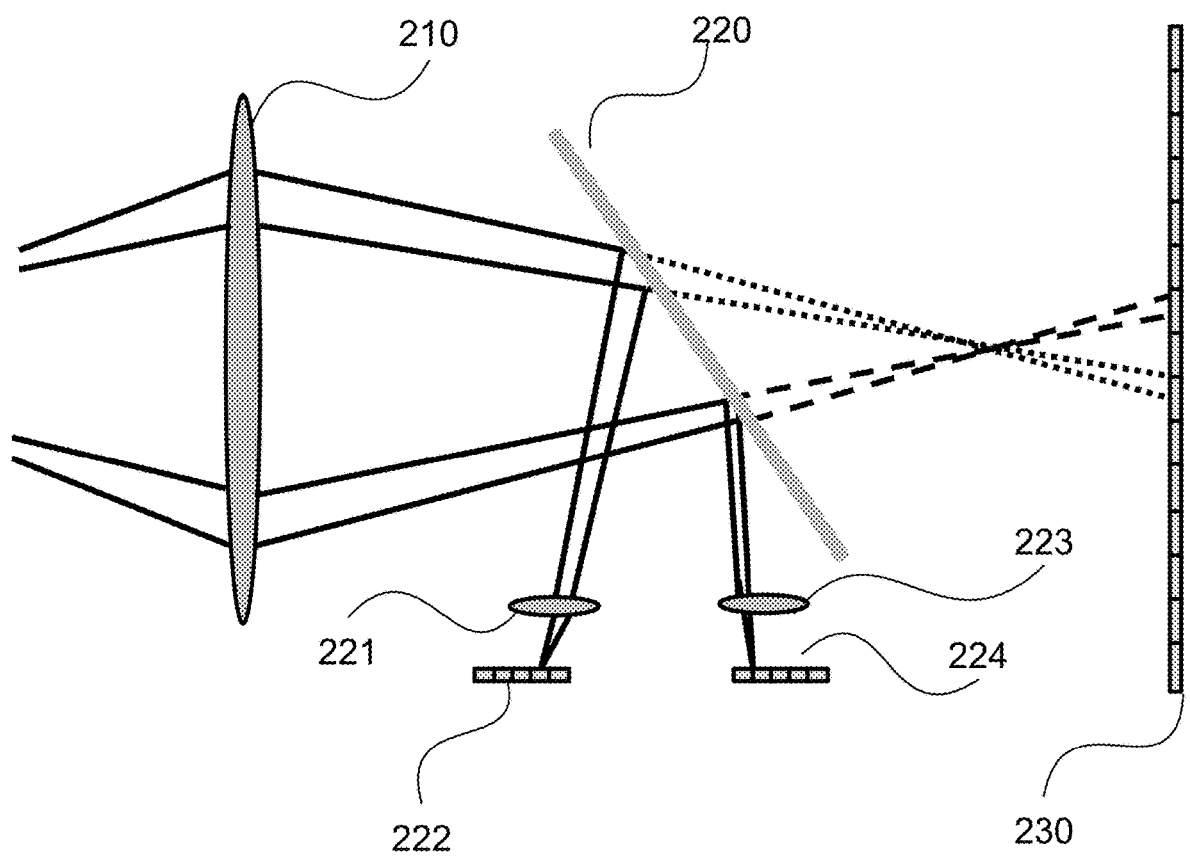
FIG. 2A is a simplified diagram showing a mechanism of phase-difference detection autofocus.

In traditional digital single-lens reflex (DSLR) cameras, phase-difference detection autofocus uses a pair of relatively small sensors for each autofocus (AF) point to compare information captured from two extreme sides of the lens in order to accurately determine the focus instantly. The autofocus sensors are small relative to a main image capture sensor of a digital single-lens reflex camera. FIG. 2A illustrates the mechanism of the traditional phase-difference detection autofocus in a DSLR camera. Different DSLR cameras will have different design details according to particular autofocus systems. FIG. 2A provides a simplified diagram for the purpose of explaining the basic principles of phase-difference detection autofocus. FIG. 2A illustrates the case where a camera lens is focused at a point in a scene in front of a subject, known as front focus. In front focus, the focused image of the subject is formed in between a main lens 210 and a main sensor 230 when a reflex mirror 220 is retracted for still image or video capture. In the front focus situation of FIG. 2A, the image data captured by the main sensor 230 is blurred due to defocus. When the reflex mirror 220 is in the viewing position, as shown in FIG. 2A, light coming through the two sides of the main lens 210 is directed to two relatively smaller lenses 221 and 223, respectively. When the reflex mirror 220 is not in the viewing position, the lens 210 focuses light travelling from an imaging scene through a wave deforming medium onto the image sensor 230. Assuming the subject is a point source, the images captured on two autofocus sensors 222 and 224 are a single peak. The autofocus sensors 222 and 224 are small relative to the main sensor 230.

In typical phase-difference detection autofocus systems, the autofocus sensors 222 and 224 are one-dimensional (1D) sensors. However, in some systems, the autofocus sensors can be two-dimensional sensors. Examples of image data captured on the sensors 222 and 224 is shown using one-dimensional signals in FIGS. 2B(1)-(4). In FIG. 2B(1), a pair of signals 240 illustrates the relative position of the two peaks from autofocus sensors 222 and 224. A solid line 241 represents the signal captured by the sensor 224 and a dashed line 242 represents the signal captured by the sensor 222. When the subject (the point source) is in front focus, as shown in the pair 240, the two peaks are far apart and the signal on the sensor 224 is to the left of the signal on the sensor 222. Phase-difference detection autofocus is fast because by detecting the focus shift as well as the direction the lens should move toward. In other words, phase-difference detection autofocus detects whether the subject is back focused or front focused. The focus shift and direction are detected by correlating the signals from the autofocus sensors, and searching for the peak offset in the correlation result.

Similar diagrams showing the back focus situations are in FIG. 2B(3) by a pair of signals 260 and FIG. 2B(4) by a pair of signals 270. The pair 260 demonstrates better focus than the pair 270. When a subject is in focus (not back focused or front focused), the two signals from the sensors 222 and 224 completely overlap, as shown in FIG. 2B(2) by a pair of signals 250. In the case of FIG. 2B(2) a focused image of the subject will form on the main sensor 230 when the reflex mirror 220 is retracted.

When the reflex mirror 220 flips up in the Live View mode or for video recording, no light is directed to the small autofocus sensors 222 and 224, and the camera generally relies on contrast detection for autofocus. There are two main issues with contrast detection autofocus. Firstly, when the subject is strongly defocused, many images at different focus distances are required to determine an accurate defocus distance. Additionally, contrast detection autofocus cannot tell the difference between front and back focus, which means that searching for the right focus direction slows down the autofocus process.

Dual-pixel autofocus (DAF) technology mainly differs from the arrangement of FIG. 2A in using a different type of main sensor, being suitable for autofocus. In dual-pixel autofocus technology, instead of having one photodiode for each image pixel, the dual-pixel autofocus sensor (the main sensor such as the sensor 230) is a complementary metal-oxide semiconductor (CMOS) sensor that has two photodiodes for each image pixel position. FIG. 3 shows a 3-by-5 example 300 of pixel arrays in a DAF CMOS sensor. An element 310 indicates an example of the left photodiode and an element 320 represents an example of the right photodiode. An element 330 represents a whole pixel made up of two photodiodes. The elements 310, 320 and 330 capture image data of objects of a scene. For example, the element 310 captures image data relating to left pixel data of the overall scene, and the pixel 320 captures image data relating to right pixel data of the overall scene. In other arrangements, the dual-pixel autofocus sensor can have a top photodiode and a bottom photodiode instead of left and right photodiodes. In still other arrangements, each pixel of the main sensor can have a left photodiode, a right photodiode, a top photodiode and a bottom photodiode. The example methods described herein relate to an implementation having left and right photodiodes.

Figure 4A:
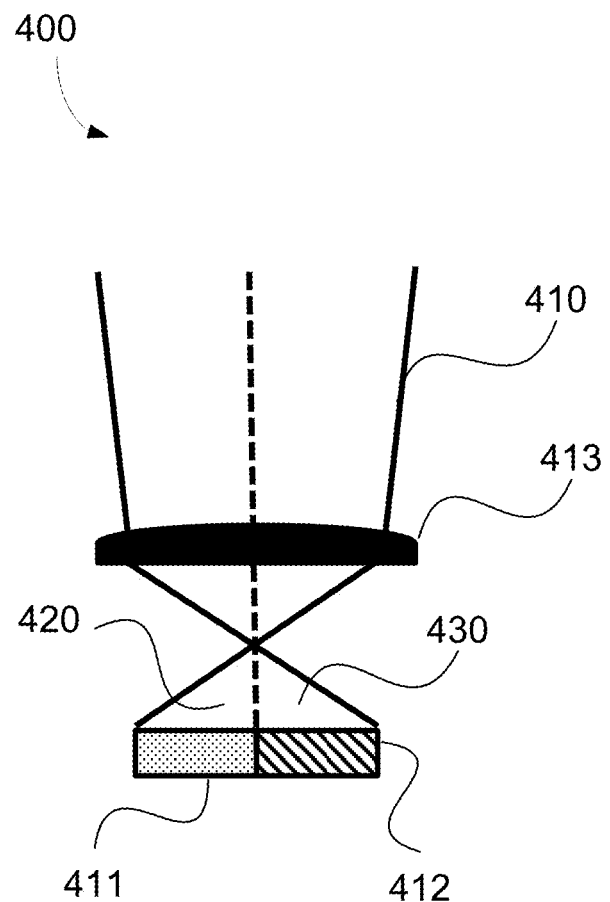
FIG. 4A shows an imaging and autofocus mechanism of a dual-pixel autofocus sensor pixel.

FIG. 4A shows the autofocus stage of dual-pixel autofocus (DAF) technology. In an arrangement 400, an incident light beam 410 passes through a micro lens 413. The incident light beam 410 is projected as shown by an area 420 onto a left photodiode 411 and, as shown by an area 430, onto a right photodiode 412.

Figure 4B:
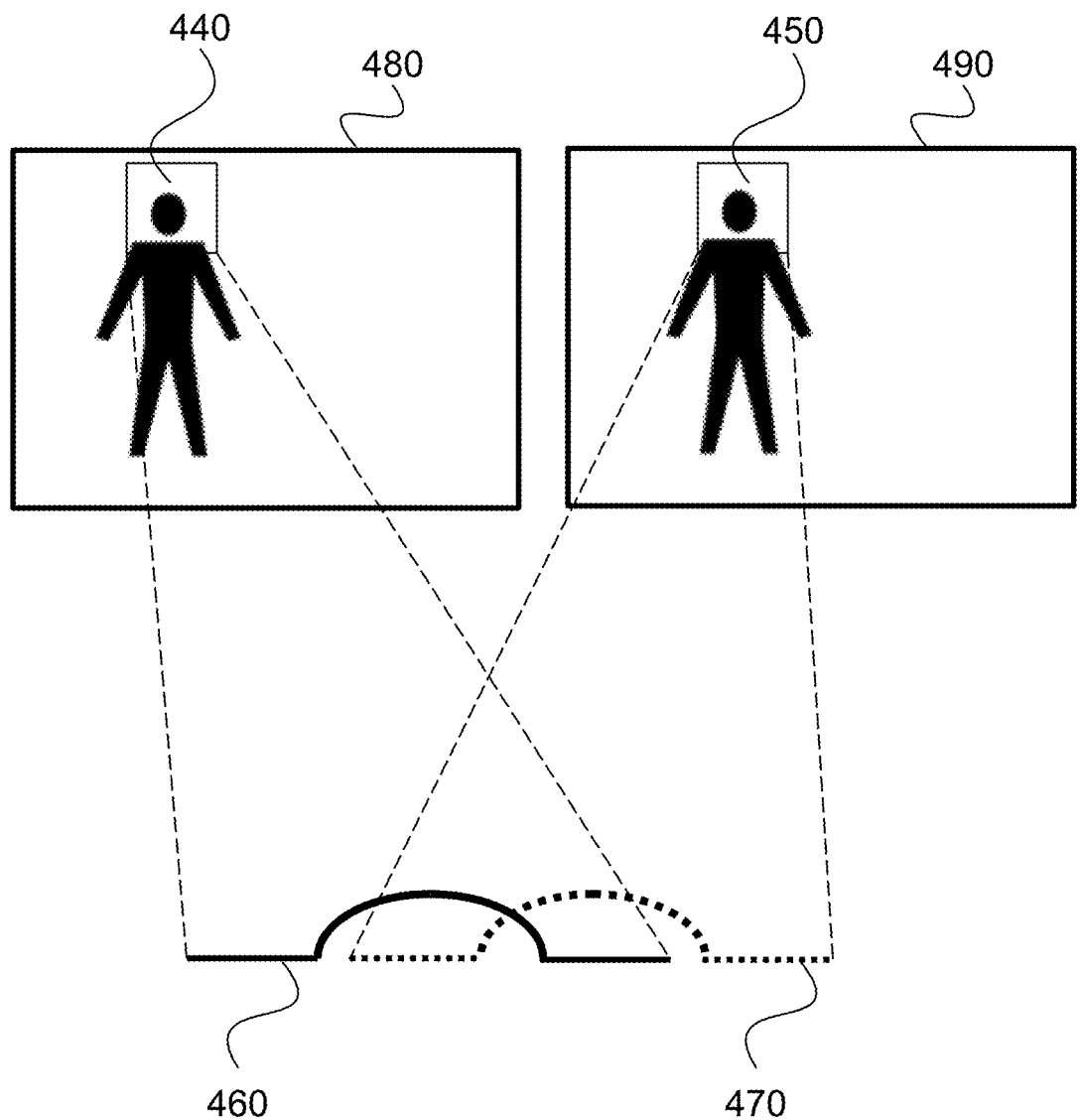
FIG. 4B shows an autofocus mechanism of a dual-pixel autofocus sensor.

All the left photodiodes on the dual-pixel sensor form a left view image 480 and all the right photodiodes form a right view image 490, as shown in FIG. 4B. In FIG. 4B, the signal captured using an autofocus area 440 in the left image 480 and the signal captured using an autofocus area 450 in the right image 490 are compared in a similar manner to the standard phase-difference detection autofocus process shown in FIGS. 2A and 2B. Similarly, when two received signals (such as signals 460 and 470) completely overlap, the object is in focus. In the imaging stage where the pixels are recording information, the left and right images 480 and 490 are simply combined as one image. Because the autofocus and the imaging function are combined in one pixel, it is possible to use almost the whole sensor for phase-difference detection autofocus, thus improving the autofocus speed as well as low-light performance during live preview stills capture and during video recording.

Figure 13A:
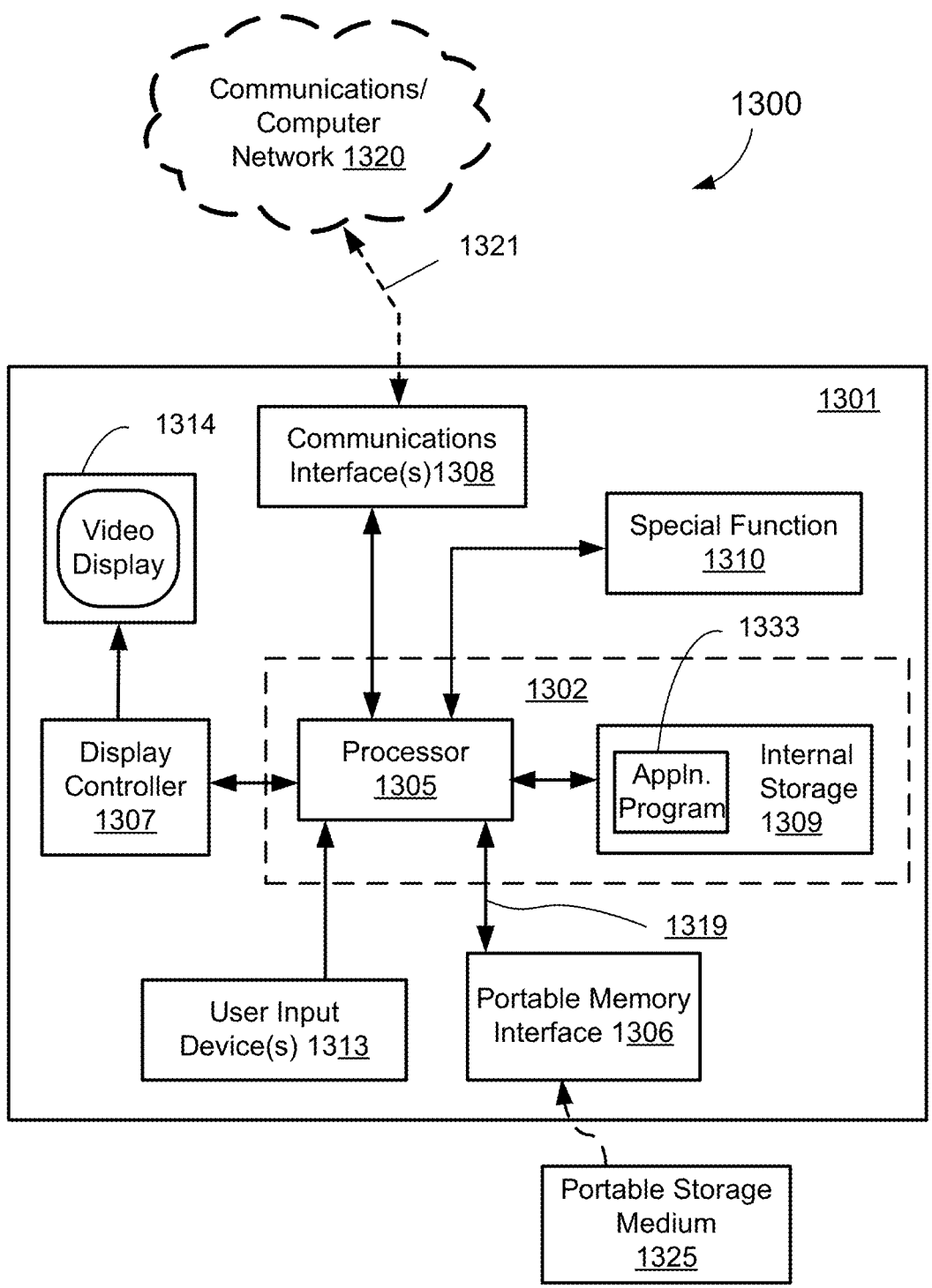
FIGS. 13A and 13B collectively form a schematic block diagram representation of an electronic device upon which described arrangements can be practised.
Figure 13B:
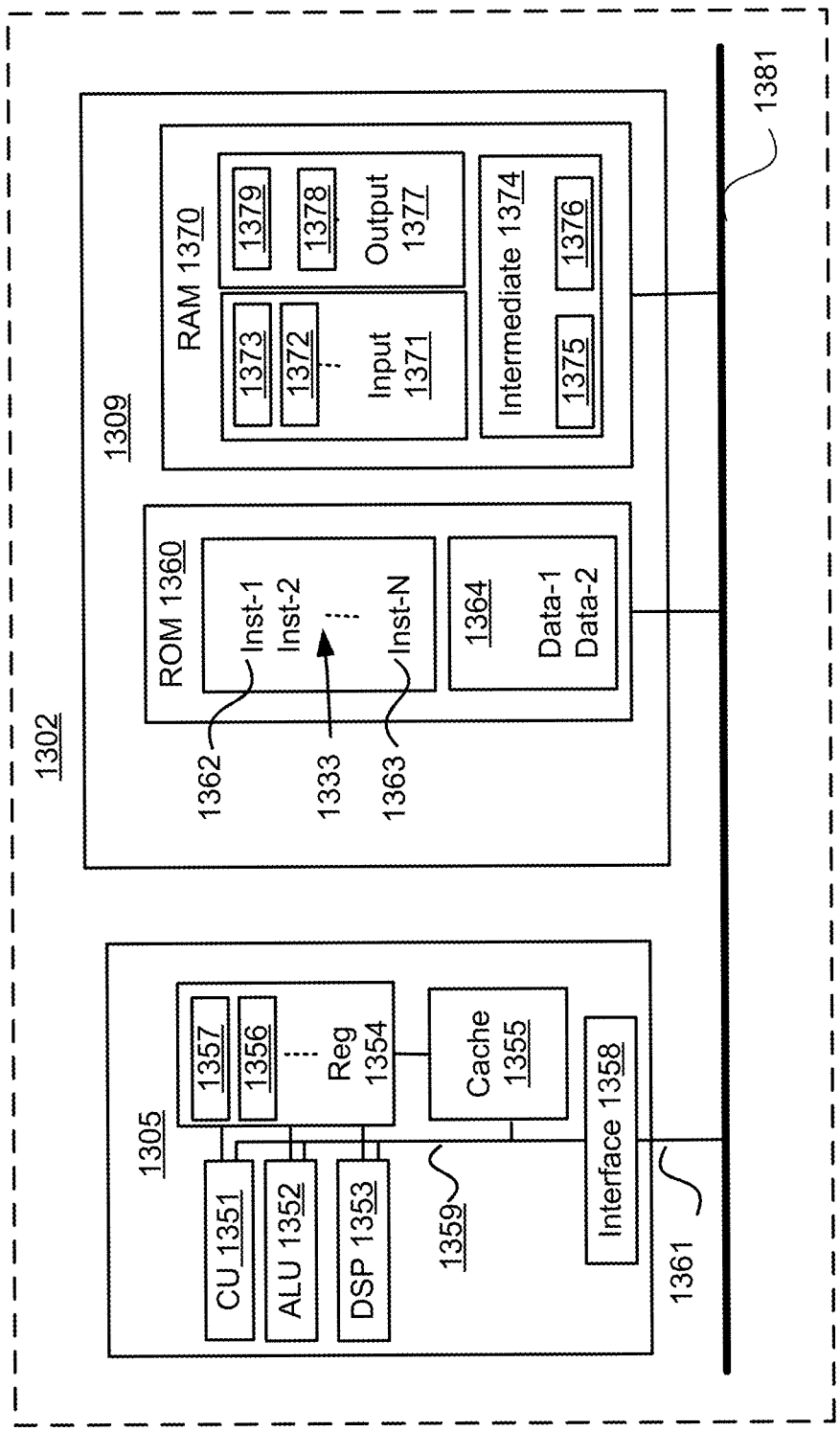

FIGS. 13A and 13B collectively form a schematic block diagram of a general purpose electronic device 1301 including embedded components, upon which the methods to be described are desirably practiced. The electronic device 1301 is typically an image capture device, or an electronics device including an integrated image capture device, in which processing resources are limited. Nevertheless, the methods to be described may also be performed on higher-level devices such as desktop computers, server computers, and other such devices with significantly larger processing resources and in communication with an image capture device, for example via a network. For example, the arrangements described may be implemented on a server computer for a post-processing application.

The image capture device is preferably a dual-pixel autofocus image capture device, such as dual-pixel autofocus digital camera or video camera. However, in some implementations a camera with an image sensor with phase-detect focus pixels can be used to measure turbulence in a wave deforming media. In an image sensor with phase-detect focus pixels, a large proportion of the pixels are standard pixels which collect light from the full aperture of the main lens, but a subset of the pixels are focus pixels which are half-masked, with either the left half or the right half of each focus pixel being masked. The focus pixels within a region of the image sensor can be used to form a left image and right image, which can then be used to estimate disparity, which is normally used to estimate defocus. In other implementations, a stereo image capture device, such as a stereo camera can be used to measure turbulence in a wave deforming media.

As seen in FIG. 13A, the electronic device 1301 comprises an embedded controller 1302. Accordingly, the electronic device 1301 may be referred to as an "embedded device." In the present example, the controller 1302 has a processing unit (or processor) 1305 which is bi-directionally coupled to an internal storage module 1309. The storage module 1309 may be formed from non-volatile semiconductor read only memory (ROM) 1360 and semiconductor random access memory (RAM) 1370, as seen in FIG. 13B. The RAM 1370 may be volatile, non-volatile or a combination of volatile and non-volatile memory. The memory 1309 can store image data captured by the device 1301.

The electronic device 1301 includes a display controller 1307, which is connected to a video display 1314, such as a liquid crystal display (LCD) panel or the like. The display controller 1307 is configured for displaying graphical images on the video display 1314 in accordance with instructions received from the embedded controller 1302, to which the display controller 1307 is connected.

The electronic device 1301 also includes user input devices 1313 which are typically formed by keys, a keypad or like controls. In some implementations, the user input devices 1313 may include a touch sensitive panel physically associated with the display 1314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 13A, the electronic device 1301 also comprises a portable memory interface 1306, which is coupled to the processor 1305 via a connection 1319. The portable memory interface 1306 allows a complementary portable memory device 1325 to be coupled to the electronic device 1301 to act as a source or destination of data or to supplement the internal storage module 1309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1301 also has a communications interface 1308 to permit coupling of the device 1301 to a computer or communications network 1320 via a connection 1321. The connection 1321 may be wired or wireless. For example, the connection 1321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 1301 is configured to perform some special function. The embedded controller 1302, possibly in conjunction with further special function components 1310, is provided to perform that special function. For example, where the device 1301 is a digital camera, the components 1310 typically represent a lens system, focus control and image sensor of the camera. The lens system may relate to a single lens or a plurality of lenses. In particular, if the image capture device 1301 is a dual-pixel autofocus device the components 310 comprises a CMOS sensor having left and right photodiodes for each pixel, as described in relation to FIG. 3. The special function components 1310 is connected to the embedded controller 1302. In implementations where the device 1301 is a stereo camera, the special function components 1310 can include lenses for capturing left and right images.

As another example, the device 1301 may be a mobile telephone handset. In this instance, the components 1310 may represent those components required for communications in a cellular telephone environment. Where the device 1301 is a portable device, the special function components 1310 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 1302, where the processes of FIGS. 7 to 11 may be implemented as one or more software application programs 1333 executable within the embedded controller 1302. The electronic device 1301 of FIG. 13A implements the described methods. In particular, with reference to FIG. 13B, the steps of the described methods are effected by instructions in the software 1333 that are carried out within the controller 1302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1333 of the embedded controller 1302 is typically stored in the non-volatile ROM 1360 of the internal storage module 1309. The software 1333 stored in the ROM 1360 can be updated when required from a computer readable medium. The software 1333 can be loaded into and executed by the processor 1305. In some instances, the processor 1305 may execute software instructions that are located in RAM 1370. Software instructions may be loaded into the RAM 1370 by the processor 1305 initiating a copy of one or more code modules from ROM 1360 into RAM 1370. Alternatively, the software instructions of one or more code modules may be pre-installed in a non-volatile region of RAM 1370 by a manufacturer. After one or more code modules have been located in RAM 1370, the processor 1305 may execute software instructions of the one or more code modules.

The application program 1333 is typically pre-installed and stored in the ROM 1360 by a manufacturer, prior to distribution of the electronic device 1301. However, in some instances, the application programs 1333 may be supplied to the user encoded on one or more CD-ROM (not shown) and read via the portable memory interface 1306 of FIG. 13A prior to storage in the internal storage module 1309 or in the portable memory 1325. In another alternative, the software application program 1333 may be read by the processor 1305 from the network 1320, or loaded into the controller 1302 or the portable storage medium 1325 from other computer readable media. Computer readable storage media refers to any non-transitory tangible storage medium that participates in providing instructions and/or data to the controller 1302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1301. Examples of transitory or non-tangible computer readable transmission media that may also participate in the provision of software, application programs, instructions and/or data to the device 1301 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1333 and the corresponding code modules mentioned above may be executed to implement one or more graphical user interfaces (GUIs) to be rendered or otherwise represented upon the display 1314 of FIG. 13A. Through manipulation of the user input device 1313 (e.g., the keypad), a user of the device 1301 and the application programs 1333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 13B illustrates in detail the embedded controller 1302 having the processor 1305 for executing the application programs 1333 and the internal storage 1309. The internal storage 1309 comprises read only memory (ROM) 1360 and random access memory (RAM) 1370. The processor 1305 is able to execute the application programs 1333 stored in one or both of the connected memories 1360 and 1370. When the electronic device 1301 is initially powered up, a system program resident in the ROM 1360 is executed. The application program 1333 permanently stored in the ROM 1360 is sometimes referred to as "firmware". Execution of the firmware by the processor 1305 may fulfil various functions, including processor management, memory management, device management, storage management and user interface.

The processor 1305 typically includes a number of functional modules including a control unit (CU) 1351, an arithmetic logic unit (ALU) 1352, a digital signal processor (DSP) 1353 and a local or internal memory comprising a set of registers 1354 which typically contain atomic data elements 1356, 1357, along with internal buffer or cache memory 1355. One or more internal buses 1359 interconnect these functional modules. The processor 1305 typically also has one or more interfaces 1358 for communicating with external devices via system bus 1381, using a connection 1361.

The application program 1333 includes a sequence of instructions 1362 through 1363 that may include conditional branch and loop instructions. The program 1333 may also include data, which is used in execution of the program 1333. This data may be stored as part of the instruction or in a separate location 1364 within the ROM 1360 or RAM 1370.

In general, the processor 1305 is given a set of instructions, which are executed therein. This set of instructions may be organised into blocks, which perform specific tasks or handle specific events that occur in the electronic device 1301. Typically, the application program 1333 waits for events and subsequently executes the block of code associated with that event. Events may be triggered in response to input from a user, via the user input devices 1313 of FIG. 13A, as detected by the processor 1305. Events may also be triggered in response to other sensors and interfaces in the electronic device 1301.

The execution of a set of the instructions may require numeric variables to be read and modified. Such numeric variables are stored in the RAM 1370. The disclosed method uses input variables 1371 that are stored in known locations 1372, 1373 in the memory 1370. The input variables 1371 are processed to produce output variables 1377 that are stored in known locations 1378, 1379 in the memory 1370. Intermediate variables 1374 may be stored in additional memory locations in locations 1375, 1376 of the memory 1370. Alternatively, some intermediate variables may only exist in the registers 1354 of the processor 1305.

The execution of a sequence of instructions is achieved in the processor 1305 by repeated application of a fetch-execute cycle. The control unit 1351 of the processor 1305 maintains a register called the program counter, which contains the address in ROM 1360 or RAM 1370 of the next instruction to be executed. At the start of the fetch execute cycle, the contents of the memory address indexed by the program counter is loaded into the control unit 1351. The instruction thus loaded controls the subsequent operation of the processor 1305, causing for example, data to be loaded from ROM memory 1360 into processor registers 1354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1333, and is performed by repeated execution of a fetch-execute cycle in the processor 1305 or similar programmatic operation of other independent processor blocks in the electronic device 1301.

According to the classic Kolmogorov turbulence model, the turbulent energy is generated by eddies on a large scale $L_0$. The large eddies spawn a hierarchy of smaller eddies. Dissipation is not important for the large eddies, but the kinetic energy of the turbulent motion is dissipated in small eddies with a typical size $l_0$. The caracteristic size scales $L_0$ and $l_0$ are called the outer scale and the inner scale of the turbulence, respectively. There is considerable debate over typical vlaues of $L_0$, which is likely to be a few tens to hundreds of meters in most cases. On the other hand, $l_0$ is of order a few millimetres. In the inertial range between $l_0$ and $L_0$, there is a universal description for the tubulence spectrum, i.e., of the turbulence strength as a function of the eddy size. This somewhat surprising result is the underlying reason for the importance of the Kolmogorov turbulence model.

In general, atmospheric turbulence is considered a stationary process, which at a particular spatial location x becomes a random variable with a probability density function (pdf) $p_f(x)$, a mean $\mu$ and a variance $\sigma^2$. Because the process is stationary, the pdf $p_f(x)$, the mean $\mu$ and the variance $\sigma^2$ are the same for every location x. Therefore, the optical transfer function of atmospheric turbulence can be characterised using a structure function. A structure function is the mean square difference between two values of a random process at x and x+r:

$$D_f(r) = \langle |f(x)-f(x+r)|^2 \rangle = \int_{-\infty}^{\infty} |f(x)-f(x+r)|^2 p_f(x)dx \quad [1]$$

where x, x+r are 3D vectors that represent two positions and $\langle \circ \rangle$ represents the inner product.

The structure function of Equation [1] measures the expectation value of the difference of the values of f measured at two positions x and x+r. For example, the temperature structure function $D_T(x, x+r)$ is the expectation value of the difference in the readings of two temperature probes located at x and x+r. When the separation r between the two locations is between the inner scale $l_0$ (a few mm) and the outer scale $L_0$ (~10 to more than 100 meters), the structure function D of quantities such as refractive index and temperature in atmospheric turbulence can be assumed to be homogeneous (D (x, x+r)=D (r)) and isotropic ((D(r)=D (|r|)). The Kolmogorov model suggests that the structure function D obeys a power law:

$$D_f(r) = C^2 r^{2/3}, \quad l_0 < r > L_0 \quad [2]$$

where C is a constant dependant on the altitude and r=|r|. When f represents the refractive index n, Equation [2] becomes:

$$D_n(r) = C_n^2 r^{2/3}, \quad l_0 < r < L_0 \quad [3]$$

where $C_n$ is the refractive index structure function constant and is dependent on the altitude z. Assuming the wavefront can be expressed as $\Psi(x)=e^{i\phi(x)}$, where $\phi(x)$ is the phase, the spatial coherence function of the wavefront $\Psi(x)$ is defined as:

$$C_\Psi = \langle \Psi(x)\Psi^*(x+r) \rangle = \langle e^{i(\phi(x)-\phi(x+r))} \rangle =$$
$$e^{-\langle |\phi(x)-\phi(x+r)|^2 \rangle /2} = e^{-D_\phi(r)/2} \quad [4]$$

In Equation [4] the amplitude of the wavefront $\Psi(x)$ is omitted for simplification because the phase fluctuation is most responsible for the atmospheric distortions. Equation [4] also uses the fact that $\phi(x)$ has Gaussian statistics due to contribution from many independent variables and the central limit theorem.

$C_\Psi(r)$ is a measure of how 'related' the light wave $\Psi$ is at one position (e.g. x) to its values at neighbouring positions (say x+r). It can be interpreted as the long exposure optical transfer function (OTF) of atmospheric turbulence.

Using the relationship between the phase shift and the refractive index fluctuation:

$$\phi(x) = \frac{2\pi}{\lambda} \int_h^{h+\delta h} n(x,z)dz \quad [5]$$

where n(x,z) is the refractive index at height z, $\lambda$ is the wavelength of the light and $\delta h$ is the thickness of the atmosphere layer, the coherence function can be expressed as:

$$C_\Psi(r) = e^{-3.44\left(\frac{r}{r_0}\right)^{5/3}} \quad [6]$$

where the Fried parameter $r_0$ is defined as:

$$r_0 = \left[0.423\frac{4\pi^2}{\lambda^2}\sec(T)\int C_n^2(z)dz\right]^{-3/5} \quad [7]$$

In Equation [7] T is the zenith angle of observation, sec represents the secant function and $C_n^2$ is sometimes referred to as turbulence strength. Similarly, the phase structure function $D_\phi(r)$ in Equation [4] can be written as:

$$D_\phi(r) = 6.88\left(\frac{r}{r_0}\right)^{5/3} \quad [8]$$

A camera with a DAF (Dual-pixel AutoFocus) sensor is essentially a stereo camera system with a baseline B equal to half the main lens aperture diameter D. Geometrically, the disparity between the left view and right view images at each DAF sensor pixel is approximately equal to half the diameter of the blur kernel formed by a standard defocused image with the same aperture diameter.

Figure 5A:
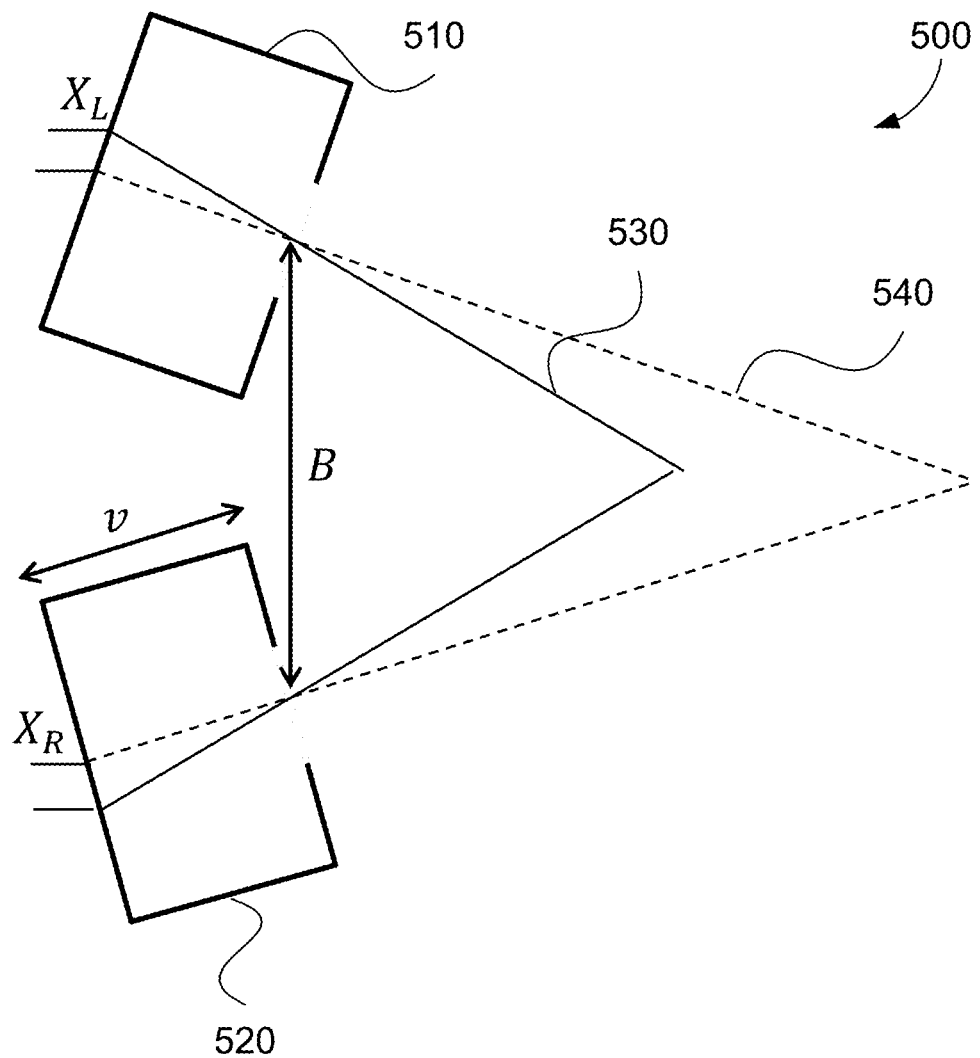
FIGS. 5A and 5B show similarity of a stereo imaging system and a defocused shot.

In FIG. 5A, an arrangement 500 is a simplified diagram demonstrating disparity between the left and right images in a stereo system. The left and right cameras, represented by 510 and 520, capture the image of the same object simultaneously. Because of the stereo geometry, an object captured in the right camera 520 will be shifted relative to the object captured in the left camera 510. Dashed lines 540 illustrate a case where the object maps to the centre of both sensors of the cameras 510 and 520. The solid lines 530 illustrate a case where the image location deviates from the centre of the two sensors of the cameras. In the arrangement 500, the relative shift between the left and right images can be expressed as $(X_R - X_L)$. The relative shift is known as the stereo disparity.

Figure 5B:
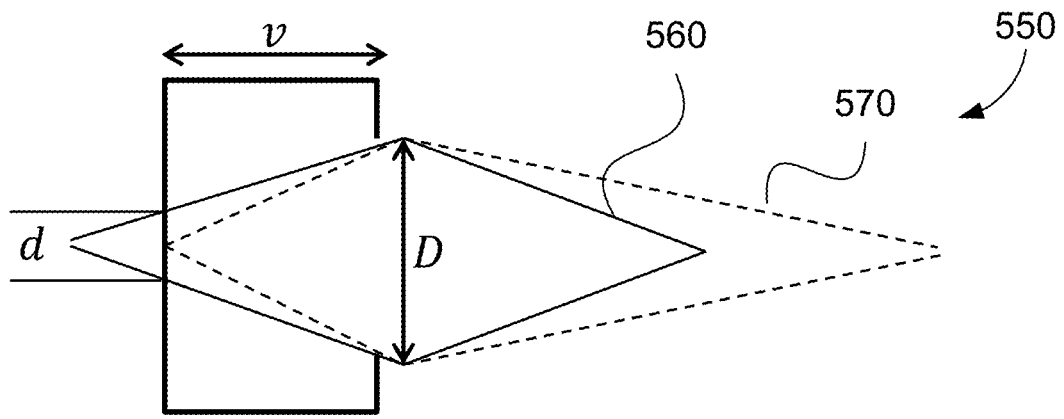

Similarly, in an arrangement 550 of FIG. 5B, dashed lines 570 show a case where the object is in focus and solid lines 560 show a case where the object is defocused (back focused). In the defocused case indicated by the lines 560, each point source in the object becomes a light spot with diameter d on the image plane. In the case of front focus, a similar result can be obtained. In the present disclosure, the back focused case is only used for discussion for simplicity and ease of reference. The front focused case is apparent from the back focused wherever necessary. Assuming the lines 530 represent the same object distance in the stereo arrangement 500 as the lines 560 in the case of defocus, and also assuming that the lines 540 represent the same object distance in the stereo arrangement 500 as the lines 570 in the case of defocus. Also assuming that the distances v from the lens to the image sensor plane are the same in both stereo and defocus arrangements 500 and 550 respectively, the radius of the light spot in the defocus case can be shown to be equal to the left and right disparity in the stereo camera case.

For a DAF system, the stereo baseline B is equal to half the diameter of the main lens, as the baseline is between the centres of the 2 sub-apertures formed within the main lens by the apertures of the DAF photodiodes. Accordingly, the stereo disparity caused by defocus in a DAF system corresponds to half the defocus blur diameter of the main lens, $$\delta x = |X_R - X_L| = d/2 \qquad [9]$$

where $\delta x$ is the defocus disparity and d is the diameter of the blur spot from a main lens with diameter D. This principle can be used together with the focal length of the main lens f, the current focus distance between the main lens and the sensor to calculate the amount of defocus distance that corresponds to a DAF stereo disparity, which can then be used to drive the main lens to the best focus position for the subject.

In the case where atmospheric turbulence is not negligible, the defocus disparity on the DAF sensor corresponding to image defocus blur is caused by a combination of defocus blur caused by the strength of phase fluctuations due to turbulent air flow and defocus blur caused by a difference between the focus distance of the lens and the subject distance. In long distance imaging situations such as surveillance, however, the main lens is focused on objects in the scene which are often far away from the camera and beyond the hyper-focal distance. Therefore, an assumption is made that in long distance surveillance, the defocus effect detected on a DAF sensor is mostly due to atmospheric turbulence.

Figure 6:
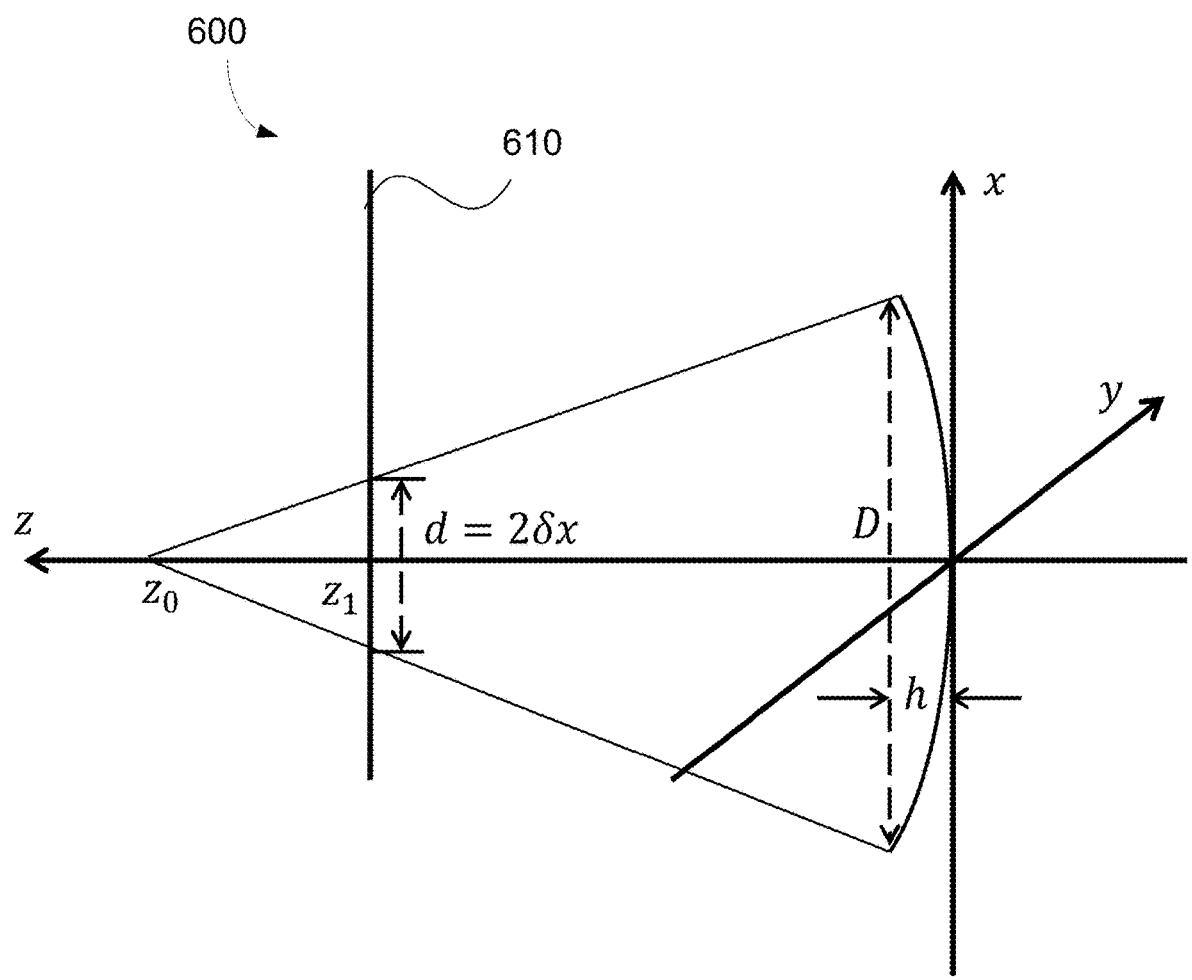
FIG. 6 shows a relationship between the defocus distance and the wavefront disturbance.

FIG. 6 shows an arrangement 600 illustrating a relationship between an image plane 610 and defocus. Ideally, when an object in a scene is in focus, the main lens (for example 210) of an image capture device produces in the lens' exit pupil a spherical wave having a centre of curvature at $(0,0,z_0)$ in the (x,y,z) coordinate in FIG. 6. In FIG. 6, $z_0$ is the location of the image sensor (for example 230 or 300) when the object is in focus. In the case of back focus, the image sensor 610 is at $z_1$ instead. The distance $z_1$ between the lens and the sensor is also known as the focus distance. Basic optical theory indicates:

$$W(x, y) = \frac{x^2 + y^2}{2z_0} \qquad [10]$$

where $z_0$ is the location where the spherical wave converges and W(x,y) is the optical path difference between the centre of the aperture (0,0) and any location (x,y) on the wavefront. Equation [10] has been simplified using the fact that $W(x,y) \ll z_0$ at the exit pupil. In other words, the optical path difference W(x,y) at the exit pupil can be approximated by a parabola. In the case of defocus, the image sensor is at $z_1$ instead of $z_0$. Therefore, $$W(x, y) = \frac{x^2 + y^2}{2z_0} = \frac{x^2 + y^2}{2z_1} - \epsilon \frac{x^2 + y^2}{2z_1^2} \qquad [11]$$

where $\epsilon = |z_0 - z_1|$. Equation [11] has been simplified using the fact that $\epsilon \ll z_0$. The wavefront error due to defocus is derived using Equation [11]:

$$|\Delta W(x, y)| = \epsilon \frac{x^2 + y^2}{2z_1^2} \qquad [12]$$

The aperture averaged mean squared wavefront error $W_E$ is thus the integral of $|\Delta W(x,y)|^2$ across the aperture divided by the aperture surface area:

$$W_E = \left[ \int\int_{x,y=0}^{x,y\,in\,aperture} |\Delta W(x, y)|^2 dx dy \right] / S_A \qquad [13]$$

where $S_A$ is the aperture surface area. Given the simple paraboloid shape of $|\Delta W(x,y)|$, using the aperture radius $$\frac{D}{2}$$

and assuming a circular aperture, the wavefront error can be derived as $$W_E = \epsilon^2 D^4 / 192 z_1^4 \qquad [14]$$

$W_E$ represents a defocus wavefront deviation in captured image data. From FIG. 6, the relationship between $\epsilon$ and the diameter d of the 'geometric shadow', equivalent to 'light spot' on the image plane 610 in geometric optics, can be expressed as:

$$\frac{\epsilon}{d} = (z_0 - h)/D \qquad [15]$$

where h is the height of the paraboloid at the exit pupil, as shown in FIG. 6. According to Equation [10], $$h = W(x, y)_{x^2+y^2=\frac{D^2}{4}} = \frac{D^2}{8z_0}.$$

In other words, h is the optical path difference between the centre of the aperture (0,0) and (x,y) at the edge of the exit pupil.

$$\epsilon = d\left(\frac{z_0}{D} - \frac{D}{8z_0}\right) \qquad [16]$$

Simplifying Equation [16] using $D^2 \ll 8 z_0^2$, provides:

$$\epsilon = d\frac{z_0}{D} \qquad [17]$$

The aperture averaged mean squared wavefront error $W_E$ can be expressed using Equations [14] and [17]:

$$W_E = d^2 D^2 / 192 z_1^2 \qquad [18]$$

As described above, the diameter d of the light spot on the image plane in the defocused case is equal to twice the defocus disparity $\delta x$ (Equation [9]). Meanwhile, in long distance imaging, the image sensor in the camera is often at the focal length distance from the exit pupil, therefore $$W_E = \delta x^2 \cdot D^2 / 48 f^2 \qquad [19]$$

where f is the focal length of the main lens. Equation [19] shows that the aperture averaged mean squared wavefront error $W_E$ can be expressed as a simple function of the defocus disparity δx, the aperture diameter D and the focal length f.

On the other hand, it has been shown that residual aperture averaged mean squared phase error $P_E$ due to atmospheric turbulence can be expressed using the aperture diameter D and the Fried parameter $r_0$. The aperture averaged mean square phase error $\Delta P_E$ due to defocus can be calculated with the Zernike modal expansion of the phase perturbation. The Zernike modal expansion of the phase perturbation is described in Michael C. Roggemann, Bryon M. Welsh *Imaging through turbulence*, CRC Press LLC, 1996, ISBN 0-8493-3787-9, page 99, Table 3.4. The mean squared phase error $\Delta P_E$ is related to the mean squared optical path length error $W_E$ (Equation [18]) using the relationship $$\Delta P_E = \left(\frac{2\pi}{\lambda}\right)^2 W_E,$$

where λ is the wavelength.

As described by Roggemann and Welsh (Michael C. Roggemann, Bryon M. Welsh *Imaging through turbulence*, CRC Press LLC, 1996, ISBN 0-8493-3787-9, page 99), the residual mean-squared phase error $\Delta P_E$ is determined based upon the aperture diameter D and the Fried parameter $r_0$ and varies with the Zernike mode index.

The Nth residual mean-squared phase error $P_E$ value corresponds to the case when the first N Zernike modes from the turbulence corrupted wavefront phase have been removed. For example, mode index 1 corresponds to piston mode. The $P_E$ value corresponding to Zernike mode 1 is determined as $$P_{E1} = 1.0299\left(\frac{D}{r_0}\right)^{\frac{5}{3}}.$$

The mode indices 2 and 3 represent the two orthogonal tilt modes. The $P_E$ value corresponding to Zernike mode 2 is determined as $$P_{E2} = 0.582\left(\frac{D}{r_0}\right)^{\frac{5}{3}}.$$

For example, $P_E$ value corresponding to Zernike mode 3:

$$P_{E3} = 0.134\left(\frac{D}{r_0}\right)^{\frac{5}{3}}.$$

represents the aperture averaged mean-squared phase error with the removal of the piston mode $Z_1$ and the two orthogonal tilt modes $Z_2$ and $Z_3$. The $P_E$ value corresponding to Zernike mode 4, representing defocus, is determined as $$P_{E4} = 0.111\left(\frac{D}{r_0}\right)^{\frac{5}{3}}.$$

Assuming the impact of the atmospheric turbulence in long distance imaging is mostly limited to defocus, the aperture averaged mean squared phase error $\Delta P_E$ due to turbulence can be expressed as:

$$\Delta P_E = P_{E3} - P_{E4} = 0.134\left(\frac{D}{r_0}\right)^{\frac{5}{3}} - 0.111\left(\frac{D}{r_0}\right)^{\frac{5}{3}} \quad [20]$$

In Equation [20], aberrations corresponding to lower-order Zernike modes such as piston, tip and tilt and aberrations corresponding to higher-order Zernike modes such as coma and astigmatism are ignored. That is, it is assumed that optical aberrations other than defocus are small enough to be left out in the calculation of the Fried parameter $r_0$.

Using Equations [19], [20] and the relationship between the mean squared phase error $\Delta P_E$ and the mean squared wavefront error $W_E$, the Fried parameter $r_0$ is determined using:

$$r_0 = \left(\frac{\lambda f}{5.98\delta x}\right)^{\frac{6}{5}} \cdot D^{-\frac{1}{5}} \quad [21]$$

where f is the focal length of the lens in millimetres, δx is the disparity in the left and right images in nanometres and D is the aperture diameter in millimetres. The Fried parameter represents a strength of phase fluctuation caused by turbulence through a wave deforming medium such as the atmosphere.

In some circumstances, the assumption of $D^2 \ll 8z_0^2$ can be inaccurate: for example, when the aperture is wide open. If the assumption is inaccurate, a more accurate estimate of the Fried parameter $r_0$ can be determined following the same procedure used to derive Equation [21] using Equation [16] instead of Equation [17].

Equation [21] gives the estimated Fried parameter $r_0$ in millimetres. Alternatively, other physical length units can be used with appropriate scaling. The wavelength value λ in Equation [21] is normally set to 550 nm to approximate the green light wavelength for imaging systems using visible light. One can easily replace the wavelength value with other values for different imaging situations. For example, for infrared or near-infrared long-distance imaging, λ can be set to a value in the range 800-1000 nm.

Alternatively, rather than using dual-pixel techniques, the defocus distance E in Equation [11] can be estimated with depth from defocus techniques using two frames captured at different times with each frame captured using a different focus distance $z_1$. The defocus distance is accordingly determined using relative blur between at least first and second images. The first captured image is convolved with a set of relative blur functions creating a set of convolved first images. The relative blur functions are created using knowledge of the lens performance for a variety of focus distances $z_1$ and defocus distances E, where the relative blur is the convolution kernel which matches the difference in blur between one focus distance $z_1$ and a second focus distance $z_1'$ for a defocus distance E according to the knowledge of the lens performance. The squared difference of the convolved first images and the second captured image is determined, creating a set of blur difference images. For each pixel in the image, the minimum value of the set of blur difference images at that pixel is used to determine the corresponding defocus distance E for that pixel. Accordingly, the defocus wavefront deviation is based upon the defocus distance determined using the relative blur between the first and second images.

Techniques using depth from defocus to determine the defocus distance typically involve using different settings of the image capture device to capture images of a scene. In other implementations, determining the focus distance using depth from defocus techniques can relate to capturing two frames using the same settings at different time, such that differing atmospheric turbulence provides a means of determining the change in defocus distance $\Delta\in$ between the two frames. Using an initial defocus distance $\in_0$ calculated using a pair of captured images with different focus distances $z_1$ at the start of the sequence, the defocus distance E of the current frame is determined by adding the initial defocus distance $\in_0$ to the changes in defocus distance $\Delta\in$ for all frames from the start of the sequence to the current frame.

The defocus distance E is then used to determine the turbulence strength indicator $r_0$ in Equation [21]. In the case where the defocus distance is used, one extra frame is needed at the beginning of the video sequence to start the process of relative blur calculation and the focus distance $z_1$ of each frame needs to be alternated to capture the defocus caused by turbulence. For example, the focus distance $z_1$ (distance between the sensor and the lens) can be increased by $\delta z_1$ for the second frame from that of the first frame and the focus distance $z_1$ can be decreased by $\delta z_1$ for the third frame from that of the second frame and so on. Assuming the scene is far away from the camera at hyper-focal distance, any relative blur between two consecutive frames is caused by atmospheric turbulence since the whole scene is assumed to be in focus excluding the effect of atmospheric turbulence. Then the relative blur can be used to calculate the defocus distance $\in$ which can then be used to calculate the Fried parameter $r_0$ using Equations [9], [17] and [21]. When using a depth from defocus technique, a combination of both right and left images such as an average image can be used to determine a defocus wavefront deviation between the temporally separate captures. Alternatively, because the defocus is determined from two temporally separate images, either the right or left image from the DAF sensor can be used to determine a defocus wavefront deviation between the temporally separate images using a smaller value for the lens aperture diameter D corresponding to the smaller effective aperture for the right or left images.

Alternatively, single image defocus estimation methods can be used to obtain a defocus estimate, for example as described in S. Zhou and T. Sim: "Defocus map estimation from a single image", Pattern Recognition, September 2011, pp. 1852-1858. A single frame or image is used to estimate the defocus distance E. The single frame or image used to estimate the defocus distance E effectively provides reference image data. This estimation is performed by detecting edges in the captured image, convolving the captured image with a 2D Gaussian kernel with a predetermined width $\sigma_0$ to form a convolved image used as reference image data, determining the ratio R of the gradient magnitude of the captured image over the gradient magnitude of the convolved image where the ratio is calculated at a pixel with maximum gradient across each edge, and using the ratio R and the predetermined width $\sigma_0$ to determine the blur amount $\sigma$ for each pixel along each edge. The blur amount $\sigma$ can be used to determine the defocus distance $\in$ using knowledge of the performance of the lens. The defocus distance is then used to determine a strength of phase fluctuations caused by the wave deforming medium as described above. Obtaining the defocus estimate using single image defocus eliminates the need for an extra starting frame while generally giving results with lower accuracy for the defocus distance $\in$.

Figure 7:
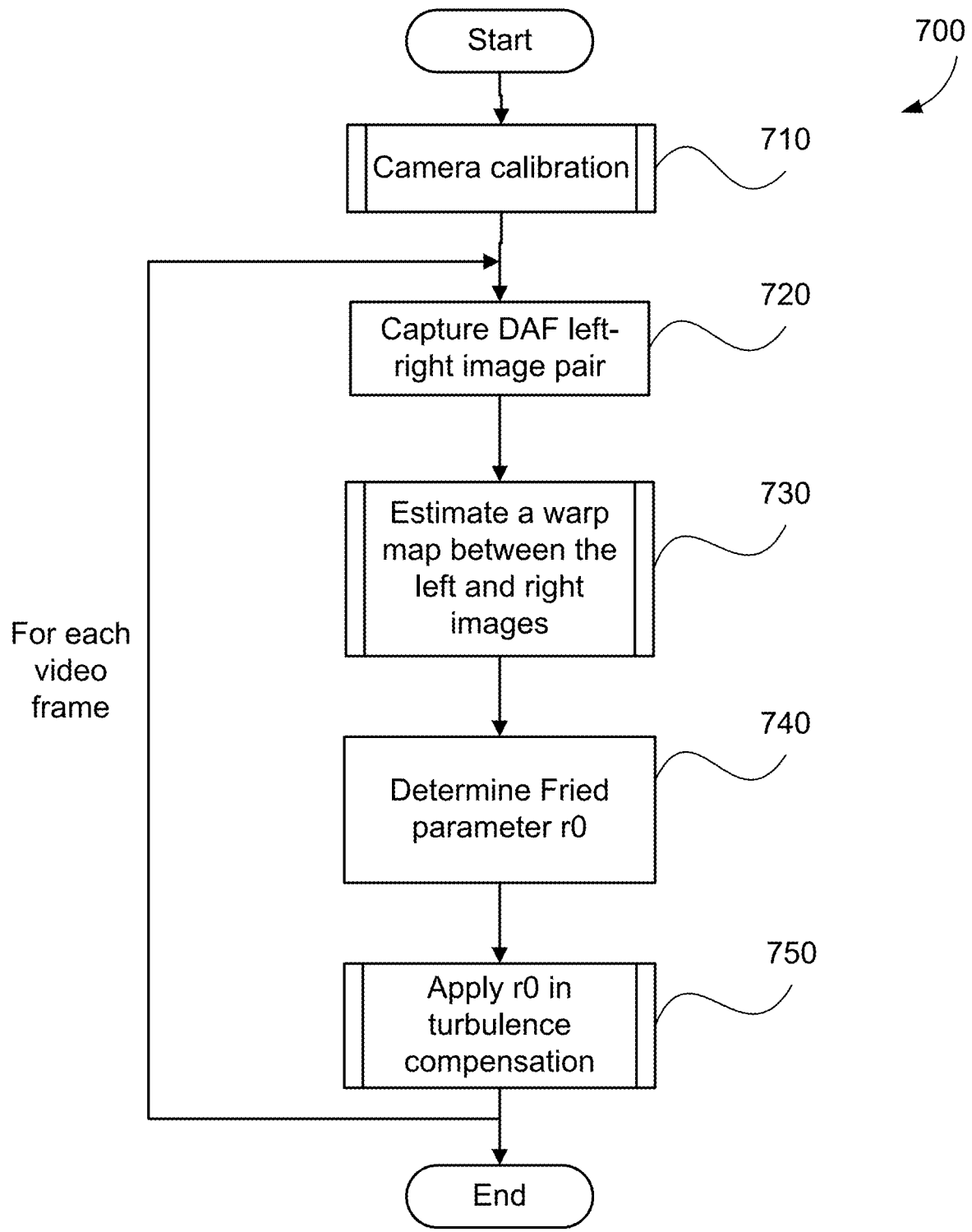
FIG. 7 shows a method of processing captured image data by estimating turbulence strength (Fried parameter $r_0$) and applying $r_0$ in turbulence compensation.

FIG. 7 shows a method 700 of processing captured image data according to the arrangements described. The method 700 is typically implemented as one or more modules of the application 1333, stored on the memory 1309 and controlled by execution of the processor 1305.

The method 700 starts at a calibration step 710. Execution of step 710 calibrates the camera 700 to bootstrap the recording process. The method 700 proceeds under execution of the processor 1305 to a capture step 720. At step 720, the camera 1300 operates to capture a DAF left-right image pair. The left-right image pair is captured through a wave deforming medium, for example through atmosphere. The image data for the image pair can be stored in the memory 1309 for example.

The method 700 proceeds from step 720 to an estimation step 730. Execution of step 730 estimates the warp map between the left and right images. Step 730 effectively operates to determine disparity between left pixel data and right pixel data of a DAF image. Step 730 also operates to determine a defocus wavefront deviation for one or more portions of the captured images using disparity between images or pixel data. A portion may relate to an object in the images, for example. The method 700 proceeds from step 730 to a determining step 740. Step 740 executes to determine the Fried parameter $r_0$ using the disparity obtained from the warp map estimated at step 730. Step 740 effectively operates to determine phase fluctuations, or a strength of phase fluctuations, caused by the wave deforming medium. Step 740 uses disparity in the image data determined at step 730. The method 700 proceeds from step 740 to an application step 750. Execution of step 750 applies $r_0$ to a turbulence compensation method. Step 750 effectively operates to use the strength of phase fluctuations to process captured images to compensate for phase fluctuations or turbulence in the atmosphere. For a camera with DAF, step 750 applies turbulence compensation to an image formed from a combination of the left pixel data and right pixel data. For example the image to be compensated may be formed from the sum of the left and right pixel data. Accordingly, the defocus disparity measured using the left and right DAF pixel data in step 730 corresponds to the turbulence strength of the wave deforming medium affecting the combined DAF image which is compensated in step 750 by applying turbulence compensation to the combination of the left pixel data and right pixel data.

In many long distance surveillance cases, videos are recorded instead of still images. In long distance surveillance applications, the steps from 720 to 750 can be repeated for every video frame. Step 710 only needs to be executed once at the beginning of the recording in long distance surveillance applications.

In the context of the present disclosure, the word 'disparity' refers to the determined left-right shift in the warp map. Disparity in image data in the context of the present disclosure can relate to disparity between left and right pixel data (for example in the pixel 330) that corresponds to the strength of defocus for a DAF camera, or disparity between left and right images for a stereo camera. The phrase disparity can also be referred to as a 'warp map'. A warp map is a list of left and right shift amounts in units of pixels, including a sign indicating a direction of shift, associated with each pixel in the standard sensor image, whether using a DAF sensor or a stereo camera to capture images. The warp map can be the same resolution as the standard sensor image. Alternatively, the warp map may be created at a lower resolution than the standard sensor image to improve overall speed of processing or reduce noise, in which case each pixel in the lower resolution warp map is associated with multiple pixels in the standard sensor image and the shift amounts in pixels need to be scaled appropriately for the change in resolution.

In step 710, different camera calibration methods can be applied to reduce the effect of optical aberration. In an example implementation, the camera calibration step 710 captures a series of frames to extract the still background. In the implementation, a small number of frames, e.g. 5 to 10 frames, are recorded to provide a reference for the warp map estimation step 730.

Figure 9:
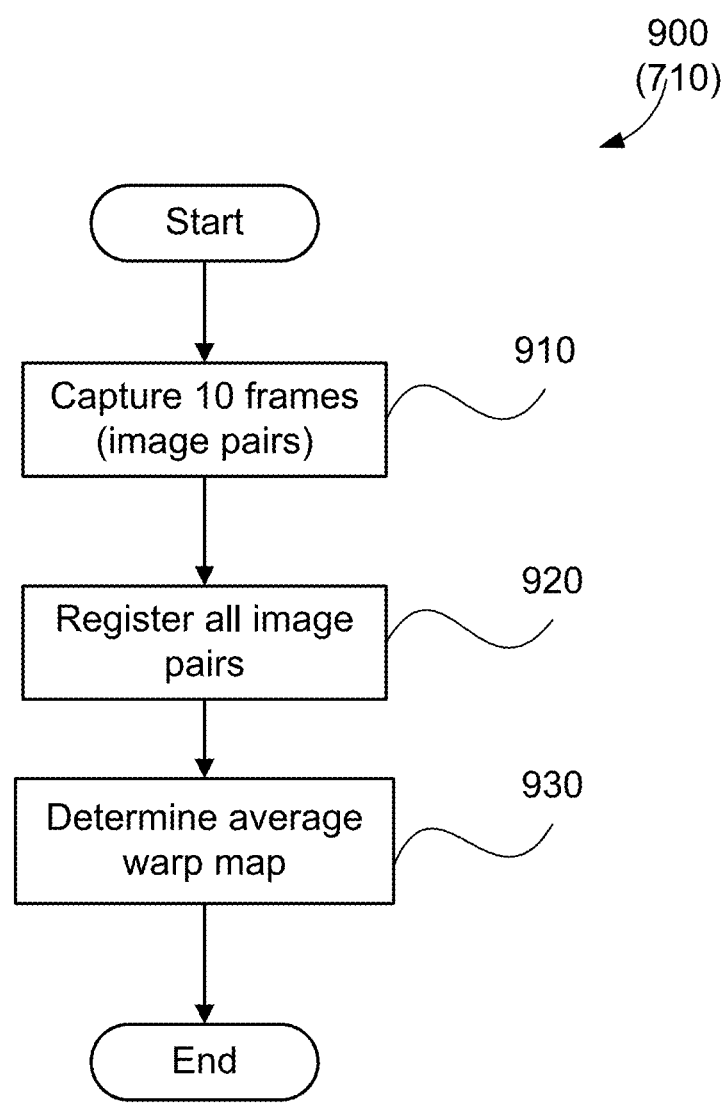
FIG. 9 shows a method of camera calibration as used in FIG. 7.

Further detail of the implementation of step 710, is now described in reference to FIG. 9. FIG. 9 shows a method 900 of determining an average warp map, as implemented at step 710. The method 900 is typically implemented as one or more modules of the application 1333, stored on the memory 1309 and controlled by execution of the processor 1305.

The method 900 starts at a step 910 and captures a number of initial left-right image pairs. The initial pairs can be stored in the memory 1309 for example. The method 900 proceeds to a registering step 920. Step 920 uses image registration techniques such as cross-correlation to generate a warp map for each of the initial left-right image pairs. The warp map can be stored in the memory 1309, for example. The method 900 continues to a determining step 930. Execution of step 930 determines the average warp map by averaging all the warp maps determined at step 920. The output of step 930 is used as a reference warp map R' in the warp map estimation step 730.

Typically, with a video frame rate of 25 frames per second, 10 frames should suffice given normal weather conditions. If atmospheric turbulence is particularly strong, for example on a hot and dry day with very little wind, a higher frame rate or more initial frames may be needed. On the other hand, on a cool and windy day, quasi-periodic turbulence tends to have a longer cycle. In the case where quasi-periodic turbulence has a longer cycle, more frames may be needed. In addition to the bootstrapping process where a reference warp map is generated, additional commonly used camera calibration methods such as the classic black-white chessboard method can be added to remove other optical aberrations.

Referring back to FIG. 7, at step 720, a left-right image pair is captured using a DAF sensor. As described above, the mechanism of DAF means the left image and the right image are captured simultaneously with a relatively small defocus disparity mostly caused by the atmospheric turbulence in the captured scene.

Figure 8:
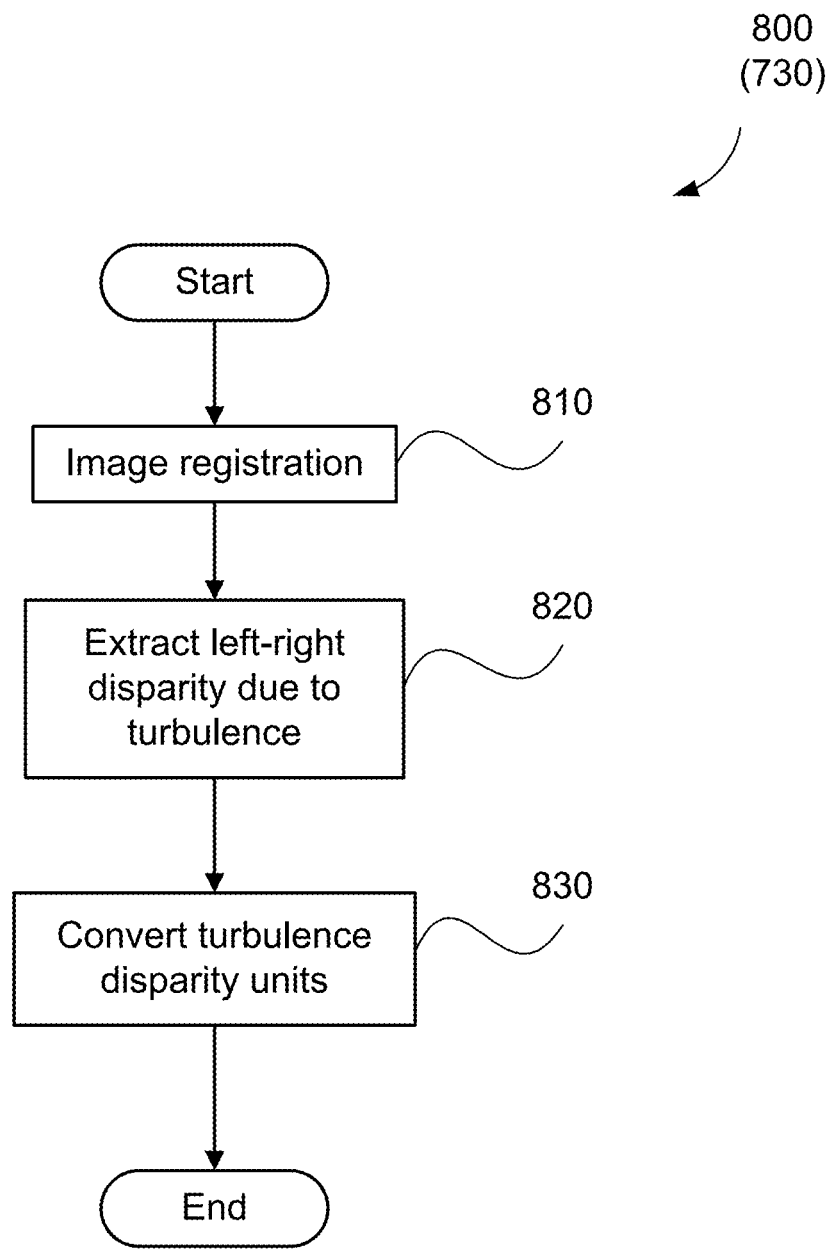
FIG. 8 shows a method of warp map estimation as used in FIG. 7.

Step 730 determines the defocus disparity (shift) between the left and the right images. Disparity between two views of the same scene can be determined using image registration algorithms such as phase correlation, optical flow, or mutual information registration. FIG. 8 shows an outline method 800 of warp map estimation, as implemented at step 730. The method 800 is typically implemented as one or more modules of the application 1333, stored on the memory 1309 and controlled by execution of the processor 1305.

The method 800 starts at a registration step 810. The step 810 performs the left-right image registration to generate a warp map R between the left image and the right image (for a stereo camera) or between left pixel and right pixel data (for a DAF camera). In some arrangements, step 820 relates to one dimensional signals captured using the autofocus sensors of a device capturing the image(s), such as 222 and 224 in FIG. 2A. The generated warp map R may be further processed to determine the defocus disparity $\delta x$ in Equation [21] in units of length such as millimetres or nanometres since the warp map R typically gives the left-right shift in number of pixels. Additionally, although an assumption has been made that the defocus disparity comes mostly from atmospheric turbulence, there may still be some residual disparity in the warp map that is actually due to depth variation in the scene, particularly if the aperture diameter D is large and if parts of the scene are closer than the hyper-focal distance. Therefore, preferably, execution of step 820 extracts the turbulence-induced disparity from the calculated warp map R by subtracting the reference warp map R' in step 930 from R. In other words, the turbulence-induced disparity is calculated as M=R−R'.

The method 800 continues to a converting step 830. At step 830, the turbulence-induced warp map M is converted from pixel units to nanometres. Conversion from pixel units to nanometers is by scaling using the size of sensor pixels. After execution of step 830, the warp map M is ready to be used as the defocus disparity $\delta x$. Depending on the method used to generate the original warp map R and the reference warp map R', the final warp map M may include small amount of disparity in directions other than left-right. In the arrangements described, only the horizontal component, i.e., the left-right disparity is used as the defocus disparity $\delta x$. Any vertical component of the warp map is discarded.

Once the defocus disparity value $\delta x$ is determined in step 730, step 740 uses a simple formula such as the one in Equation [21] to determine the Fried parameter $r_0$ for each pixel location in the current frame, corresponding to the image pair used to calculate the warp map R. The theoretical definition of the Fried parameter is based on a stationary statistics model. Strictly speaking, $r_0$ should not be treated as a measurable instantaneous value at a particular physical location. That is, $r_0$ should be considered a parameter that describes the property of a stationary multi-dimensional random process. The Fried parameter $r_0$ determined in step (740) represents a sample of the underlying parameter at a particular time and a particular spatial location.

The effect of turbulence on image quality can be described using the short exposure optical transfer function and the long exposure optical transfer function. The effect of turbulence on a captured image varies at a characteristic speed, which depends on the atmospheric and imaging system conditions. If a video frame is captured with a short exposure relative to the turbulence variation speed, for example an exposure of 5 milliseconds, the effect of the turbulence is approximately constant over the duration of the exposure, and the imaging performance can be characterised using the short exposure optical transfer function. If a video frame is captured using a long exposure relative to the turbulence variation speed, for example an exposure of 5 seconds, then the effect of the turbulence varies significantly during the exposure, and the imaging performance can be characterised using the long exposure optical transfer function. Because of the turbulence variation during a long exposure, the long exposure optical transfer function is significantly different to and lower than the short exposure optical transfer function and the long exposure image quality is lower than the short exposure image quality. In turbulence compensation algorithms, instantaneous and local sampling of turbulence strength is often helpful in tuning the algorithm, because it enables more accurate compensation of short exposures, giving a higher overall image quality after compensation. On the other hand, if the long exposure turbulence optical transfer function is measured and used to compensate a short exposure captured image, then the compensation will produce artefacts because the measured long exposure optical transfer function will be different from the short exposure optical transfer function that affected the short exposure captured image. The arrangements described allow an appropriate length exposure optical transfer function to be used based upon a measure of turbulence that occurs at a time of capture of a particular image frame.

The arrangements described relate to providing a convenient and accurate estimate of a sample so turbulence compensation algorithms can be tuned at each spatial location and in each frame. Depending on the image registration method used to generate the warp map, the left-right disparity δx does not necessarily have a resolution as high as the captured frame. If the left-right disparity has a lower resolution, the calculated Fried parameter $r_0$ will be sparse and each $r_0$ is only associated with a block of pixels or a small region in the frame instead of each pixel. Using a sparse Fried parameter is expected to be more stable when the frames are noisy.

In step 750 (FIG. 7), the determined Fried parameter $r_0$ is applied to an algorithm that corrects, or compensates for, atmospheric turbulence. One example the algorithm is tiled bispectral analysis where the classic bispectrum method is applied in parallel to overlapping tiles in the frame. In the tiled bispectral analysis method, where an anisoplanatic tile has to be assumed when calculating the phase and modulus of the original scene in Fourier domain, the spatially local turbulence strength plays a critical role on the choice of tile size because an anisoplanatic tile corresponds to consistent turbulence characteristics. In other words, a spatially local $C_n^2$ needs to be estimated. Using an incorrect value for the spatially local turbulence strength causes significant restoration artefacts in the results of the bispectral analysis method.

Figure 10:
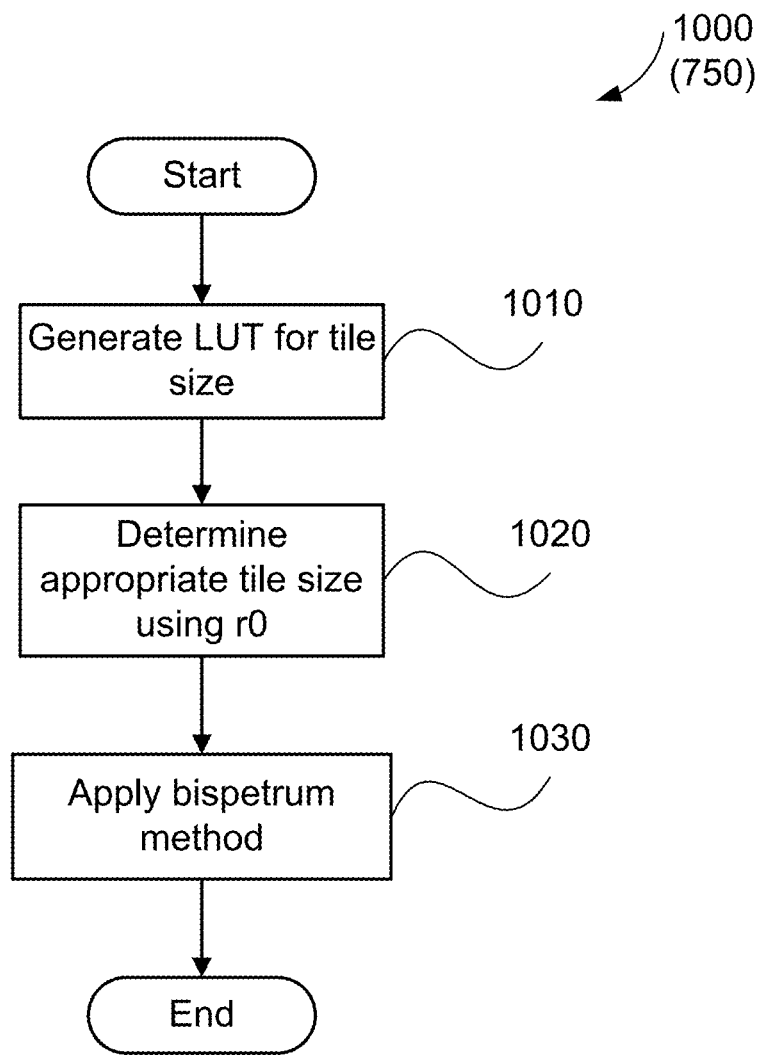
FIG. 10 shows a method of applying the estimated turbulence strength in a tiled bispectrum method.

One method of determining a suitable tile size in the bispectrum method is explained with reference to FIG. 10. FIG. 10 shows a method 1000 of applying turbulence compensation, as implemented at step 750. The method 1000 is typically implemented as one or more modules of the application 1333, stored on the memory 1309 and controlled by execution of the processor 1305.

The method 1000 starts at a generating step 1010. In step (1010), some simulated turbulence phase errors are applied to a scene with regular patterns, such as checkerboard patterns. The simulation conditions should approximately match the expected real imaging conditions, including the main lens focal length and aperture, the sensor size and pixel size, the scene distance, and the turbulence conditions. In a simulated turbulence imaging system, the turbulence phase error can be controlled by using different phase screens with different Fried parameters. Then a tile size can be chosen for each Fried parameter using either quantitative study or just inspection.

In one example implementation, useful tile size values are generated for $r_0$ values ranging from 1 to 30 millimetres with a reasonable number of samples in between. The tile size values are used to form a look-up table is some implementations. The look-up table comprises a mapping between the strength of phase fluctuations caused by the atmosphere and a tile size. If the generated $r_0$ values happen to fall between the samples in the look-up table, linear or higher-order interpolation can be used to determine a tile size to be used. The look-up table can be stored in the memory 1309. In an alternative implementation, the look-up table inputs are the defocus disparity, lens parameters, and the wavelength and the look-up table output is a tile size, i.e. the tile size is determined simply by using the defocus disparity and for a particular set of lens intrinsic characteristics and assuming that the wavelength is predetermined or constant. For example, wavelength of green light is used when imaging in visible light spectrum.

The method 1000 proceeds from step 1010 to a determining step 1020. In step 1020, using the local Fried parameter $r_0$ values in each captured frame, a local tile size is determined. For example, the current frame is divided in 4 quarters and each quarter uses a different tile size to best restore the original scene. If the $r_0$ values in a quarter are very different from each other, an average of the $r_0$ values provides a useful estimate of the underlying statistical variable. Alternatively, if the $r_0$ values in each frame can be clustered spatially, each cluster can use a single tile size. Once the appropriate tile size is chosen, the method 1000 proceeds from step 1020 to an applying step 1030.

A standard tiled bispectrum method is applied in step 1030 to produce an image compensated for turbulence. The tiled bispectrum method represents a tile-based turbulence compensation algorithm to correct for the phase fluctuations due to turbulence. The turbulence compensation is improved as the compensation varies according to the variation in turbulence across different regions within each frame and varies across different frames captured at different times.

In another implementation, the turbulence strength indicator, also referred to as the Fried parameter $r_0$, is determined in a similar way to the description above. That is, a per-frame, per-pixel (or block of pixels) Fried parameter is generated.

The temporally and spatially local $r_0$ values are particularly useful when the so-called lucky imaging method is used. In lucky imaging, a small number of frames or regions in a frame are selected from a large number of frames for image fusion. The selection is based on image quality. Because the turbulence strength can be estimated per frame and per pixel (or block of pixels) using DAF with arrangements described, using $r_0$ for lucky frame or lucky region selection is possible. For example, to compensate for turbulence effects, per-frame or per-pixel Fried parameters can be compared to select frames of regions less affected by turbulence.

Figure 11:
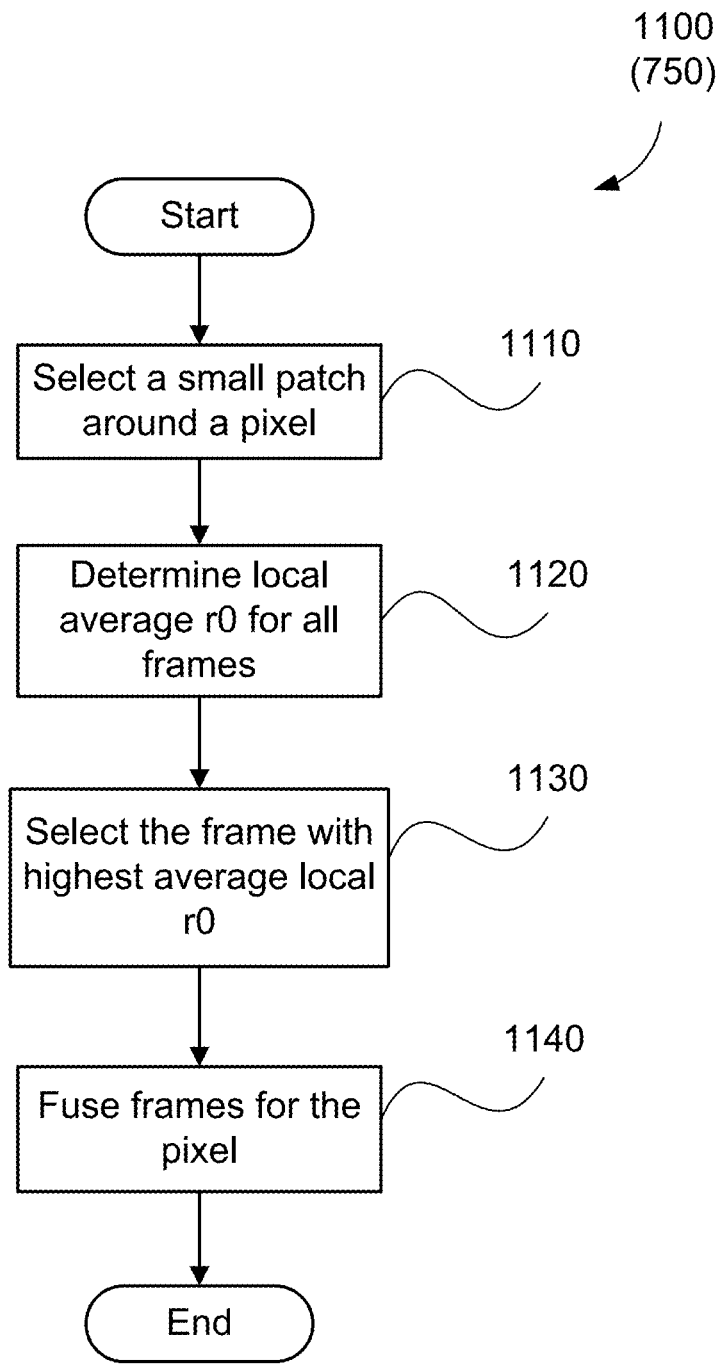
FIG. 11 shows a lucky imaging process using the estimated turbulence strength of FIG. 7.

FIG. 11 shows a scoring method 1100 to select lucky frames or regions. The method 1100 is typically implemented as one or more modules of the application 1333, stored on the memory 1309 and controlled by execution of the processor 1305. The method 1100 can be implemented at the step 750 of FIG. 7.

The method 1100 starts at a selecting step 1110. In step 1110, for a particular pixel location across all frames, a relatively small patch or region is chosen (selected) around the pixel location. Selecting the patch relates to determining corresponding regions in each of the frames. The selected patch is relatively small in the context of the frame as a whole, and can be determined by experimentation for example. The method 1100 continues to a determining step 1120. Step (1120) determines the average Fried parameter $r_0$ in the selected patch (region) for all the frames. In one example, for a pixel location (20, 30), the selected patch includes pixel locations from 10 to 30 in the x direction and 15 to 45 in the y direction. The patch has a resultant patch size of 21×31. The Fried parameter $r_0$ is then determined for regions corresponding to the selected patch in all N frames. In the case of a per-pixel $r_0$, a simple average across the patch is determined as the average turbulence strength for the particular patch and the particular frame. In the case of block of pixels, the patch size needs to be carefully chosen so that the selected patch includes exactly K blocks where K is an integer. Once N average turbulence strength values for the same patch location are determined, the method 1100 progresses to a selecting step 1130. The step 1130 operates to compare the strength of phase fluctuations for each of the patch locations. In executing the step 1130, the application 1333 chooses the frame with the lowest average turbulence strength (highest $r_0$ value) for the current pixel. That is, the pixel from the chosen frame becomes the optimal pixel for the particular pixel location. In other implementations, one or more frames or regions of frames are selected according to a predetermined threshold. The threshold may relate to a level of turbulence strength or to a proportion of the frames. The threshold is typically determined by experimentation.

The method 1100 progresses to a fusing step 1140. In step 1140, the application 1333 generates a combined frame from all the optimal pixels. Step 1140 forms a fused region based on the comparison of step 1130. As such, fusing the plurality of frames is based on a level of turbulence strength determined within each one of the plurality of frames. The combined frame gives a fused high-resolution image of the scene that has been corrupted by turbulence. Alternatively, the fused high-resolution image can be a weighted sum of all the frames where the weights are determined by the average turbulence strength for each selected patch in each frame. Fusing the frames operates to compensate for phase fluctuations caused by a wave deforming medium such as the atmosphere.

Figure 12:
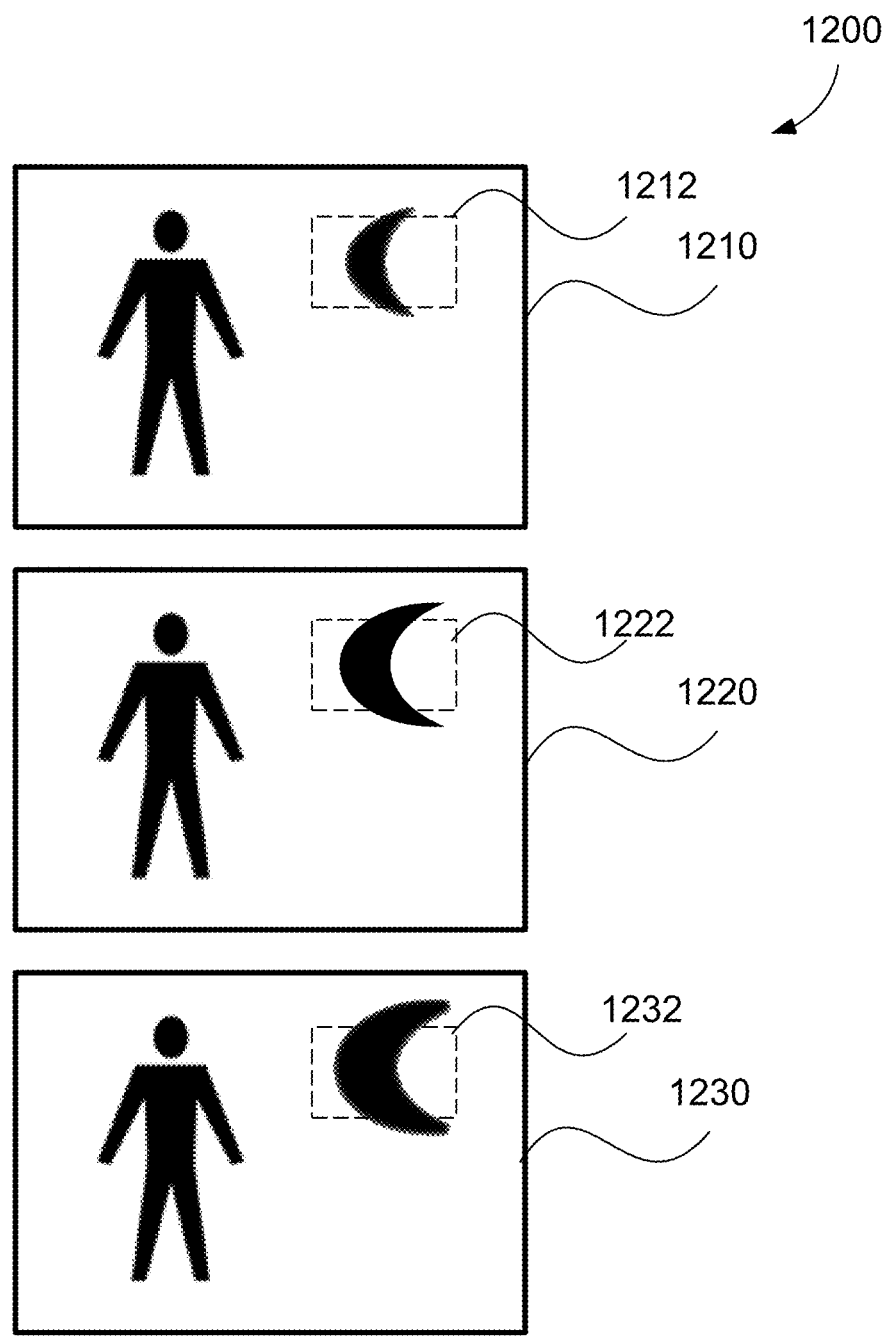
FIG. 12 shows an example of a lucky image.

FIG. 12 shows an example sequence 1200 of frames. In the sequence 1200, frames 1210 and 1230 are frames with higher turbulence strength than a frame 1220 for a selected patch (shown in dashed lines as patches 1212, 1222 and 1232) centred at a current pixel. A fused high-resolution image is generated, typically based on the strength of phase fluctuations of the regions or patches of the images. In the example of FIG. 12, the frame 1220 is selected and the pixel value at the centre of the patch 1222 in 1220 is used for the final fused frame. Alternatively, the value for the current pixel can be a weighted sum of pixels from all the three frames 1210, 1220 and 1230. The weights are determined by the calculated average turbulence strength in the small patches 1212, 1222 and 1232. For example, if the average $r_0$ is 2 cm in 1212 of the frame 1210, 3 cm in the patch 1222 of the frame 1220 and 1 cm in the patch 1232 of the frame 1230, the weight for the frame 1210 is ⅓, the weight for the frame 1220 is ½ and the weight for the frame 1230 is ⅙.

In another arrangement, the turbulence strength indicator, also referred to as the Fried parameter $r_0$, is determined in a similar way to the description above. Accordingly, a per-frame, per-pixel (or block of pixels) Fried parameter is determined.

In order to remove the blurring effect, some turbulence compensation algorithms implicitly deblur each frame to improve the resolution. For example, a straight deconvolution with a Gaussian type kernel or the kernel described in Equation [6] is used. The Fried parameter $r_0$ controls the kernel size in Equation [6]. Therefore, the measured turbulence strength indicator $r_0$ can be used to determine a point-spread function, such as a shift-variant point-spread function and deconvolving the image using the shift-variant point-spread function, where the kernel size changes across the current frame. As such, the size of the point spread function, i.e. the kernel size, at a particular position is determined using the strength of phase fluctuation at that particular pixel position (hence the name "shift-variant point spread function").

Another implementation is when a temporal-spatial diffusion method is used for turbulence compensation. Traditionally, a fixed coefficient is used across all frames to control the amount of sharpening. With real-time $r_0$ values estimated using the arrangements described, applying an individual coefficient to each frame for the spatial diffusion is implemented.

Although the turbulence strength estimation method above has been described in the context of atmospheric turbulence, the arrangements described can also be adapted to long distance imaging applications in the wave deforming media of water. The classic Kolmogorov model for turbulence analysis was originally developed for fluid dynamics. A well-known source of image distortion underwater is scattering by particles of various sizes and origins. Optical turbulence can degrade image quality on a level comparable to degradation caused by particle scattering just above a thermocline. Measurement of underwater optical turbulence follows the same steps as described in FIG. 7.

While correcting for turbulence underwater, consideration of the effect of scattering particles is important. Particles suspended in the water such as algal cells, sediments, plankton and bubbles near the surface cause the propagation direction of a portion of the light ray to change. As a consequence, images captured underwater go through an extra degradation process due to particle scattering beside light absorption, camera point spread function (PSF) and turbulence effect. Point spread function models can be used for the particle scattering process. The point spread functions are used to deconvolve the captured underwater images in order to remove the blurring effect of the particle scattering. When measuring turbulence strength in underwater imaging situations, these point spread functions can be applied to the original captured left and right images or consecutive video frames to remove the effect of scattering. Alternatively, a blind deconvolution technique can be used. Once the scattering effect is removed, the same turbulence strength estimation method as shown in FIG. 7 can be used to measure the turbulence effect independent of the scattering effect and corresponding turbulence compensation method can be applied to improve the image or video quality.

In the underwater case, the camera calibration step 710, as described in relation to FIG. 9, becomes increasingly important because the underwater imaging distance is greatly reduced compared to long distance imaging situations in atmosphere. Due to strong absorption properties of water, the imaging distance underwater is often limited to tens of meters. Accordingly, the difference between the focus distance of the lens and the subject distance is often not negligible and needs to be dealt with before the correct disparity between left and right images or consecutive video frames can be determined.

With a local and instantaneous estimate of the turbulence strength, images or video frames captured underwater can be enhanced using an adaptive algorithm tuned to the severity of degradation.

INDUSTRIAL APPLICABILITY

The arrangements described are applicable to the computer and data processing industries and particularly for the image processing images. The arrangements described are particularly suited for long range surveillance, or other industries where measurement of atmospheric turbulence is useful.

The arrangements described allow measurement of waveform deformation due to turbulence to be conducted in real-time, for example at a video rate. In one exemplary use, as a long range surveillance video is recorded, the effects of turbulence are continuously or periodically monitored. Image data for the surveillance video can be processed to compensate for the effects of turbulence at required intervals. An image capture device having a DAF sensor is particularly suited for capturing images and turbulence compensation to the images. Nonetheless, a stereo camera is also suitable for use in determining effects of turbulence from an image using the arrangements described.

The foregoing describes only some embodiments of the present disclosure, and modifications and/or changes can be made thereto without departing from the scope and spirit of the invention, the embodiments being illustrative and not restrictive.

The invention claimed is:

1. A method of compensating image data for phase fluctuations caused by a wave deforming medium, the method comprising:
   capturing, by a sensor of an imaging system, first image data and second image data for each of a plurality of pixel positions of the sensor, the sensor capturing an object through a wave deforming medium causing a defocus disparity between the first image data and second image data, the first image data and second image data are captured from different viewpoints;
   determining the defocus disparity between the first image data and the second image data, the defocus disparity corresponding to a defocus wavefront deviation of the wave deforming medium; and
   compensating the image data captured by the sensor for phase fluctuations caused by the wave deforming medium using the determined defocus disparity.

2. The method according to claim 1, wherein the first image data and the second image data is captured using a dual-pixel autofocus sensor.

3. The method according to claim 2, wherein the defocus disparity between the first image data and the second image data relates to displacement between left pixel data and right pixel data of the dual-pixel autofocus sensor.

4. The method according to claim 1, wherein the first image data and the second image data is a captured by a stereo camera, and the defocus disparity between the first image data and the second image data relates to displacement between left and right image data captured by the stereo camera.

5. The method according to claim 1, wherein the first image data and the second image data comprise a first image and a second image captured at different times, and the defocus disparity between the first image data and the second image data relates to a relative blur between the first image and the second image.

6. The method according to claim 5, wherein the defocus wavefront deviation is determined based on a defocus distance, the defocus distance being determined using the relative blur between the first image and the second image.

7. The method according to claim 1, wherein processing at least one of the first image data and second image data comprises:
   determining a look-up table comprising a mapping between a strength of phase fluctuations caused by the wave deforming medium and a tile size for a tile-based turbulence compensation method;
   selecting a tile size from the look-up table based on the determined strength of phase fluctuations; and
   applying the tile-based compensation method using the selected tile size to correct for the phase fluctuations.

8. The method according to claim 1, wherein the received first image data and second image data comprises a plurality of frames.

9. The method according to claim 8, wherein strength of phase fluctuations in a region of a frame is determined based on a plurality of samples of the strength of phase fluctuations determined within the region of the frame.

10. The method according to claim 8, further comprising:
    compensating for phase fluctuations caused by the wave deforming medium based on comparison of the strength of phase fluctuations associated with the plurality of frames.

11. The method according to claim 8, further comprising:
    compensating for phase fluctuations caused by the wave deforming medium by fusing the plurality of frames based on values of the strength of phase fluctuations determined within each one of the plurality of frames.

12. The method according to claim 11, wherein the fusing comprises:
    for each region in a fused image, determining a plurality of corresponding regions from the plurality of frames, each corresponding region being associated with a strength of phase fluctuations;
    comparing the strength of phase fluctuations for the determined corresponding regions; and
    forming a region of the fused image based on the comparison.

13. The method according to claim 12, wherein forming a region of the fused image comprises selecting a region from the determined plurality of corresponding regions having a strength of phase fluctuation below a predetermined threshold.

14. The method according to claim 12, wherein forming a region of the fused image comprises selecting a region from the determined plurality of corresponding regions having a lowest strength of phase fluctuation.

15. The method according to claim 1, wherein processing at least one of the first image data and second image data comprises deconvolving the image data using a point spread function, the size of the point spread function at a particular position being determined using the strength of phase fluctuation determined at the particular pixel position.

16. The method according to claim 1, wherein the defocus wavefront deviation is determined based on disparity in the first image data and the second image data with respect to reference image data at a predetermined pixel position, and the reference image data is determined by convolving the first image data with a kernel having a predetermined width.

17. The method according to claim 16, wherein the disparity is a ratio of a gradient magnitude of the second image data over a gradient magnitude of the reference image data, the ratio determined at a pixel with maximum gradient across an edge.

18. The method according to claim 1, wherein determining the defocus wavefront deviation comprises estimating the wavefront deviation using one dimensional signals captured using an autofocus sensor of a device capturing the image.

19. The method according to claim 1, wherein processing at least one of the first image data and second image data comprises:
    determining a region associated with the object in a plurality of frames of the received image;
    determining an average strength of phase fluctuations for the region in each of the plurality of frames, and selecting a frame based on the average strength of phase fluctuations for the region.

20. The method according to claim 19, further comprising generating a fused high-resolution image from the regions based on the average strength of phase fluctuations.

21. The method according to claim 1, further comprising determining a strength of phase fluctuations caused by the wave deforming medium using the defocus wavefront deviation and lens intrinsic characteristics, the strength of phase fluctuations being determined with reference to a defocus Zernike coefficient.

22. A non-transitory computer readable medium having at least one computer program stored thereon for causing at least one processor to perform a method for determining a turbulence strength for processing image data, the method comprising:
  receiving image data for a portion of an image captured by a dual-pixel sensor through a wave deforming medium, the dual pixel data are captured from different viewpoints;
  determining a defocus disparity between left pixel data and right pixel data of the dual-pixel sensor, the defocus disparity corresponding to a defocus wavefront deviation of the wave deforming medium; and
  determining the turbulence strength caused by the wave deforming medium using the determined defocus disparity between left pixel data and right pixel data to process the image data.

23. An image capture apparatus configured to determine phase fluctuations of a wave deforming medium, the image capturing apparatus comprising:
  a memory;
  a lens system focusing light travelling from an imaging scene through the wave deforming medium on an image sensor;
  the image sensor configured to capture image data from the lens system as first pixel data and second pixel data for each of a plurality of pixel positions, the image sensor being coupled to the memory, the memory storing the captured first pixel data and second pixel data, the first image data and second image data are captured from different viewpoints; and
  a processor coupled to the memory and configured to determine phase fluctuations caused by the wave deforming medium using a defocus disparity between the first pixel data and the second pixel data captured by the image sensor.

24. A system, comprising:
  an image capture sensor,
  a memory, and
  a processor, wherein the processor executes code stored on the memory to:
  receive, from the image capture sensor, first image data and second image data for each of a plurality of pixel positions of the image capture sensor, the image data capturing an object through a wave deforming medium causing a defocus disparity between the first image data and second image data, the first image data and second image data are captured from different viewpoints;
  determine the defocus disparity between the first image data and the second image data, the defocus disparity corresponding to a defocus wavefront deviation of the wave deforming medium; and
  compensate the image data captured by the image capture sensor for phase fluctuations caused by the wave deforming medium using the determined defocus disparity.

25. A method of compensating image data for phase fluctuations caused by a wave deforming medium, the method comprising:
  capturing, by a sensor of an imaging system, first image data and second image data for each of a plurality of pixel positions of the sensor, the sensor capturing an object through a wave deforming medium causing a defocus disparity between the first image data and second image data;
  determining the defocus disparity between the first image data and the second image data, the defocus disparity corresponding to a defocus wavefront deviation of the wave deforming medium; and
  compensating the image data captured by the sensor for phase fluctuations caused by the wave deforming medium using the determined defocus disparity, the compensating comprising processing at least one of the first image data and second image data by:
  determining a look-up table comprising a mapping between a strength of phase fluctuations caused by the wave deforming medium and a tile size for a tile-based turbulence compensation method;
  selecting a tile size from the look-up table based on the determined strength of phase fluctuations; and
  applying the tile-based compensation method using the selected tile size to correct for the phase fluctuations.

* * * * *